US012596381B2

(12) United States Patent
Motoyama

(10) Patent No.: US 12,596,381 B2
(45) Date of Patent: Apr. 7, 2026

(54) TRAVEL MAP CREATING APPARATUS, TRAVEL MAP CREATING METHOD, AND RECORDING MEDIUM

(71) Applicant: Panasonic Intellectual Property Management Co., Ltd., Osaka (JP)

(72) Inventor: Hiroyuki Motoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 18/392,525

(22) Filed: Dec. 21, 2023

(65) Prior Publication Data

US 2024/0126290 A1     Apr. 18, 2024

Related U.S. Application Data

(63) Continuation of application No. PCT/JP2021/042644, filed on Nov. 19, 2021.

(30) Foreign Application Priority Data

Jun. 30, 2021     (JP) ................................ 2021-109384

(51) Int. Cl.
　*G05D 1/246*　　(2024.01)
　*G05D 1/244*　　(2024.01)
　　　　(Continued)

(52) U.S. Cl.
　CPC ............. *G05D 1/246* (2024.01); *G05D 1/244* (2024.01); *G05D 2105/10* (2024.01);
　　　　(Continued)

(58) Field of Classification Search
　CPC .... G05D 1/246; G05D 1/244; G05D 2105/10; G05D 2107/60; G05D 2111/10;
　　　　(Continued)

(56) References Cited

U.S. PATENT DOCUMENTS

2018/0306587 A1*　10/2018　Holz ..................... B66F 9/0755
2019/0171220 A1*　6/2019　Elazary ................ B65G 1/1375
　　　　(Continued)

FOREIGN PATENT DOCUMENTS

JP　　　　6742479　　　8/2020
JP　　　2021-5031　　　1/2021
　　　　(Continued)

OTHER PUBLICATIONS

WO 2019240208 A1 English Translation of the Description (Year: 2019).*
　　　　(Continued)

*Primary Examiner* — Kito R Robinson
*Assistant Examiner* — Alexander V Gentile
(74) *Attorney, Agent, or Firm* — Wenderoth, Lind & Ponack, L.L.P.

(57)　　　　ABSTRACT

A travel map creating apparatus includes a position sensor obtaining the positional relationship of an adjacent object relative to the apparatus; a floor map creator creating a floor map based on the positional relationship; a self-position calculator calculating the self-position on the floor map; a marker identifier identifying a marker; a marker position calculator calculating the relative position of the marker to the apparatus; a mode switcher switching the mode of the (Continued)

apparatus between a floor map creation mode and a marker identification mode; a restricted access information generator, based on the floor map, the self-position, and the relative position of the marker, defining a boundary of a restricted area to which the entry of an autonomous mobile robot is prohibited and generating restricted access information including the boundary; and a travel map creator creating a travel map including the defined restricted area based on the restricted access information.

15 Claims, 12 Drawing Sheets

(51) Int. Cl.
| | | |
|---|---|---|
| G05D 105/10 | (2024.01) | |
| G05D 107/60 | (2024.01) | |
| G05D 111/10 | (2024.01) | |
| G05D 111/30 | (2024.01) | |

(52) U.S. Cl.
CPC ...... *G05D 2107/60* (2024.01); *G05D 2111/10* (2024.01); *G05D 2111/30* (2024.01)

(58) Field of Classification Search
CPC ........... G05D 2111/30; G05D 2107/40; G05D 1/2246; G05D 1/6484; G05D 1/2446; G05D 2109/10; A47L 9/2805; A47L 9/2836; A47L 9/2857; A47L 11/4011; A47L 11/4061; G09B 29/00
See application file for complete search history.

(56) References Cited

U.S. PATENT DOCUMENTS

| | | | | |
|---|---|---|---|---|
| 2022/0031136 | A1 | 2/2022 | Miura et al. | |
| 2022/0137632 | A1* | 5/2022 | Udagawa | G05D 1/0278 |
| | | | | 701/23 |
| 2023/0064687 | A1* | 3/2023 | Williams | B25J 9/1694 |

FOREIGN PATENT DOCUMENTS

| | | | | |
|---|---|---|---|---|
| JP | 2022-25721 | | 2/2022 | |
| WO | WO-2019240208 A1 * | 12/2019 | | G05D 1/02 |
| WO | WO-2020022371 A1 * | 1/2020 | | A47L 9/28 |

OTHER PUBLICATIONS

WO 2020022371 A1 English Translation of the Description (Year: 2020).*

International Search Report (ISR) issued on Jan. 11, 2022 in International (PCT) Application No. PCT/JP2021/042644.

* cited by examiner

FIG. 8

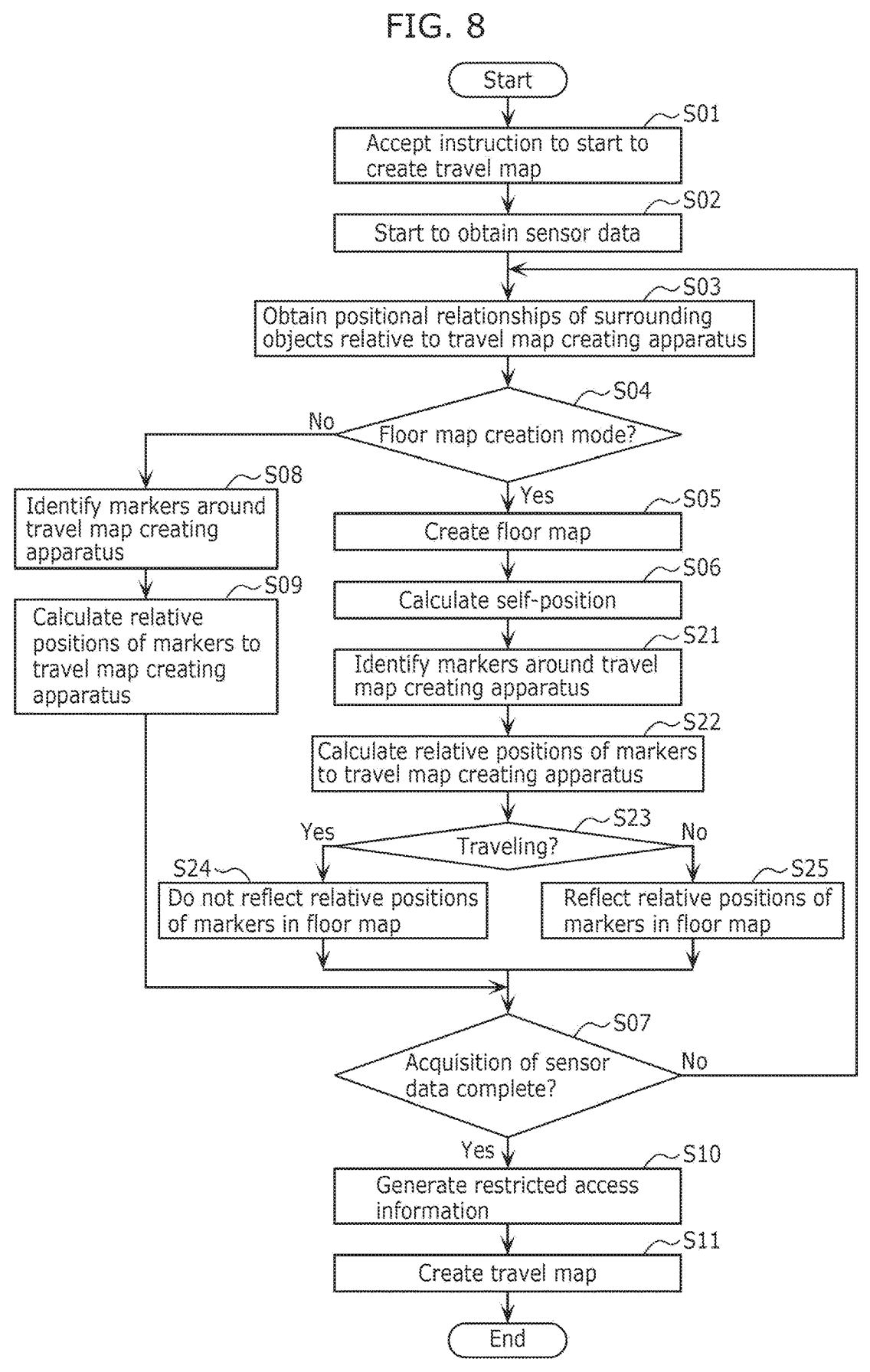

Start

S01
Accept instruction to start to create travel map

S02
Start to obtain sensor data

S03
Obtain positional relationships of surrounding objects relative to travel map creating apparatus S04
Floor map creation mode?

No →

S08
Identify markers around travel map creating apparatus

S09
Calculate relative positions of markers to travel map creating apparatus

Yes ↓

S05
Create floor map

S06
Calculate self-position

S21
Identify markers around travel map creating apparatus

S22
Calculate relative positions of markers to travel map creating apparatus

S23
Traveling?

Yes ← | → No

S24
Do not reflect relative positions of markers in floor map

S25
Reflect relative positions of markers in floor map

S07
Acquisition of sensor data complete?

No →

Yes ↓

S10
Generate restricted access information

S11
Create travel map

End

FIG. 14

TRAVEL MAP CREATING APPARATUS, TRAVEL MAP CREATING METHOD, AND RECORDING MEDIUM

CROSS REFERENCE TO RELATED APPLICATIONS

This is a continuation application of PCT International Application No. PCT/JP2021/042644 filed on Nov. 19, 2021, designating the United States of America, which is based on and claims priority of Japanese Patent Application No. 2021-109384 filed on Jun. 30, 2021. The entire disclosures of the above-identified applications, including the specifications, drawings and claims are incorporated herein by reference in their entirety.

FIELD

The present disclosure relates to a travel map creating apparatus, a travel map creating method, and a recording medium.

BACKGROUND

For example, Patent Literature (PTL) 1 discloses an apparatus and a method for creating a travel map by measuring the relative position of a reflector, carried by a human to a predetermined position, using a position sensor to generate restricted access information including the positions of zones to which the entry of an autonomous mobile robot is prohibited.

CITATION LIST

Patent Literature

PTL 1: Japanese Patent No. 6742479

SUMMARY

Technical Problem

The present disclosure provides a travel map creating apparatus and the like capable of accurately creating travel maps for autonomous mobile robots.

Solution to Problem

A travel map creating apparatus according to an aspect of the present disclosure is an apparatus that creates a travel map for an autonomous mobile robot that autonomously travels in a predetermined floor. The travel map creating apparatus includes a position sensor that detects an object around the travel map creating apparatus and that obtains a positional relationship of the object relative to the travel map creating apparatus; a floor map creator that creates a floor map representing the predetermined floor based on the positional relationship obtained by the position sensor; a self-position calculator that calculates a self-position that is a position of the travel map creating apparatus on the floor map created by the floor map creator; a marker identifier that identifies a marker around the travel map creating apparatus; a marker position calculator that calculates a relative position of the marker to the travel map creating apparatus; a mode switcher that switches a mode of the travel map creating apparatus between a floor map creation mode in which the floor map is created and a marker identification mode in which the marker is identified; a restricted access information generator that, based on the floor map, the self-position, and the relative position of the marker, defines a boundary of a restricted area to which entry of the autonomous mobile robot is prohibited and generates restricted access information including boundary information that indicates the defined boundary; and a travel map creator that creates a travel map including the defined restricted area based on the restricted access information generated by the restricted access information generator.

Moreover, a travel map creating method according to an aspect of the present disclosure is a method, performed by a travel map creating apparatus, for creating a travel map for an autonomous mobile robot that autonomously travels in a predetermined floor. The travel map creating method includes detecting an object around the travel map creating apparatus and obtaining a positional relationship of the object relative to the travel map creating apparatus; creating a floor map representing the predetermined floor based on the positional relationship obtained in the obtaining; calculating a self-position that is a position of the travel map creating apparatus on the floor map created in the creating; identifying a marker around the travel map creating apparatus; calculating a relative position of the marker to the travel map creating apparatus; switching a mode of the travel map creating apparatus between a floor map creation mode in which the floor map is created and a marker identification mode in which the marker is identified; based on the floor map, the self-position, and the relative position of the marker, defining a boundary of a restricted area to which entry of the autonomous mobile robot is prohibited and generating restricted access information including boundary information that indicates the defined boundary; and creating a travel map including the defined restricted area based on the restricted access information generated in the generating.

Note that the present disclosure may be achieved as a program for causing a computer to perform the above-described travel map creating method. Moreover, the present disclosure may be achieved as a non-transitory computer-readable recording medium, such as a CD-ROM, storing the above-described program. Moreover, the present disclosure may be achieved as information, data, or signals indicating the program. The program, information, data, and signals may be delivered through communication networks, such as the Internet.

Advantageous Effects

In accordance with the travel map creating apparatus and the like according to the present disclosure, travel maps for autonomous mobile robots can be accurately created.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a flowchart illustrating a second example of the operation of the travel map creating apparatus according to the embodiment.

FIG. 14 illustrates an example of displayed information.

DESCRIPTION OF EMBODIMENTS

Embodiments of a travel map creating apparatus and the like according to the present disclosure will be described in detail below with reference to the accompanying drawings. Note that each of the embodiments described below illustrates a specific example of the present disclosure. Accordingly, the numerical values, shapes, materials, elements, positions and connections of the elements, steps, order of steps, and the like shown in the following embodiments are mere examples and are not intended to limit any aspect of the present disclosure. Moreover, among the elements in the following embodiments, those that are not recited in any of the independent claims are described as optional elements.

The accompanying drawings and the description below are provided so that those skilled in the art can fully understand the present disclosure, and are not intended to limit the subject described in the claims.

Moreover, each drawing is a schematic diagram and is not necessarily illustrated in precise dimensions. Moreover, substantially the same configurations are given the same reference signs throughout the drawings, and duplicate explanations may be omitted or simplified.

Moreover, in the following embodiments, a top view may refer to a view where an autonomous mobile robot traveling on a floor surface of a predetermined floor is viewed from vertically above, whereas a bottom view may refer to a view where the autonomous mobile robot is viewed from vertically below.

Embodiment

[Autonomous Mobile Robot System]
[1. Overview]

First, an overview of an autonomous mobile robot system to which a travel map creating apparatus according to an embodiment is applied will be described. The autonomous mobile robot system creates a travel map with which an autonomous mobile robot can autonomously travel on a predetermined floor, and provides the travel map for the autonomous mobile robot. A travel map includes restricted areas to which the entry of the autonomous mobile robot is prohibited. Using the travel map, the autonomous mobile robot creates a travel plan on the basis of the self-position on the travel map and obstacle information. This allows the autonomous mobile robot to autonomously travel on the predetermined floor in a safe and appropriate manner.

The predetermined floor is, for example, a floor enclosed by walls in a building. The building may be, for example, a facility, such as a hotel, commercial facility, office building, hospital, nursing home, museum, or library, or an apartment house, such as a condominium. Note that the predetermined floor is not limited to a space inside the building but may be, for example, a space between adjacent buildings.

[2. Configuration]

Figure 1:
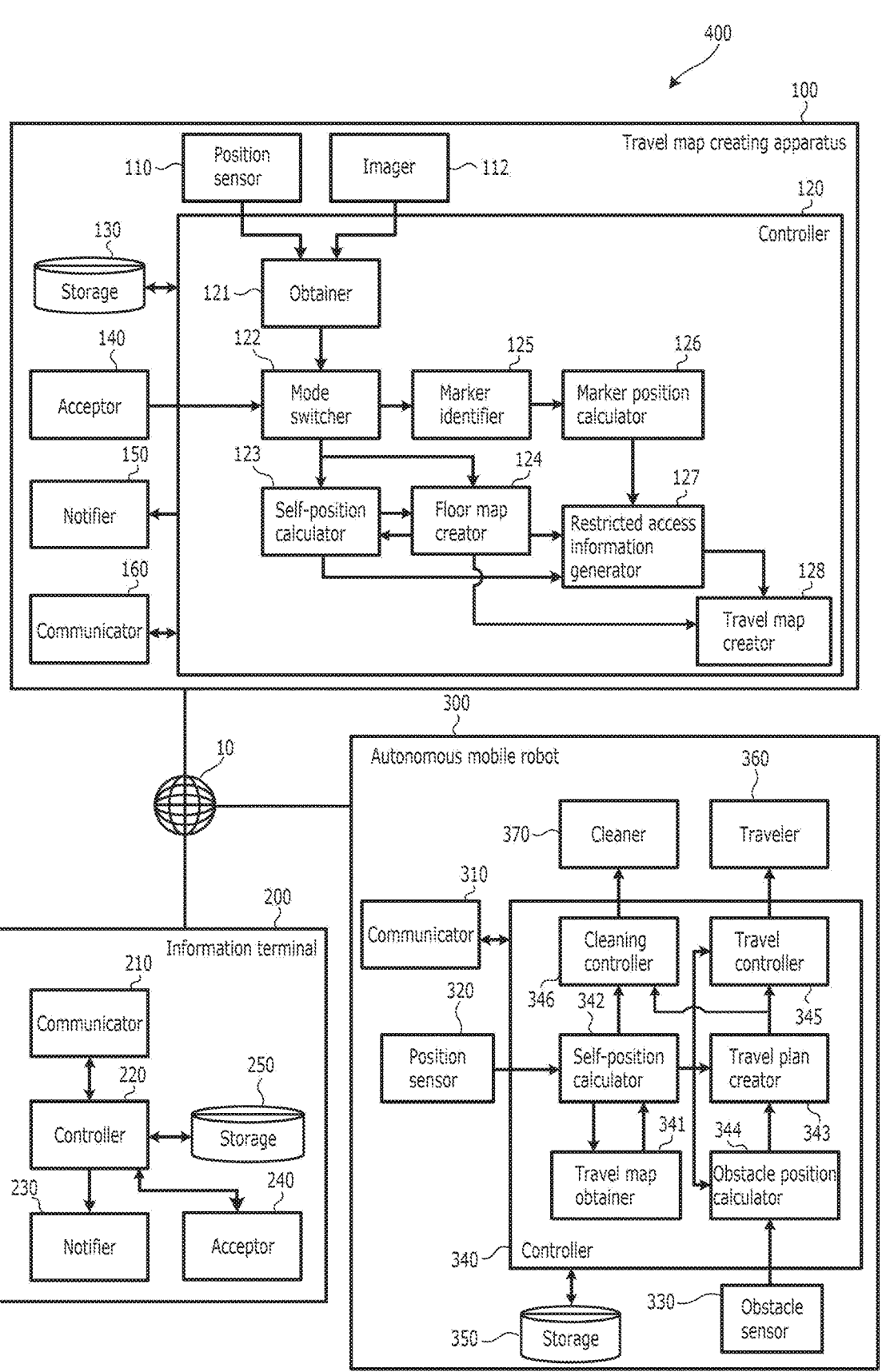
FIG. 1 is a block diagram of an example configuration of an autonomous mobile robot system to which a travel map creating apparatus according to an embodiment is applied.

Next, a configuration of the autonomous mobile robot system will be described. FIG. 1 is a block diagram of an example configuration of the autonomous mobile robot system to which the travel map creating apparatus according to the embodiment is applied.

As illustrated in FIG. 1, autonomous mobile robot system 400 includes, for example, travel map creating apparatus 100, information terminal 200, and autonomous mobile robot 300. Travel map creating apparatus 100, information terminal 200, and autonomous mobile robot 300 are connected to each other through network 10 to be able to communicate with each other. FIG. 1 illustrates an example where autonomous mobile robot 300 is a clearing robot, although not limited thereto. Configurations of the elements will now be described.

[2-1. Travel Map Creating Apparatus]

Figure 2:
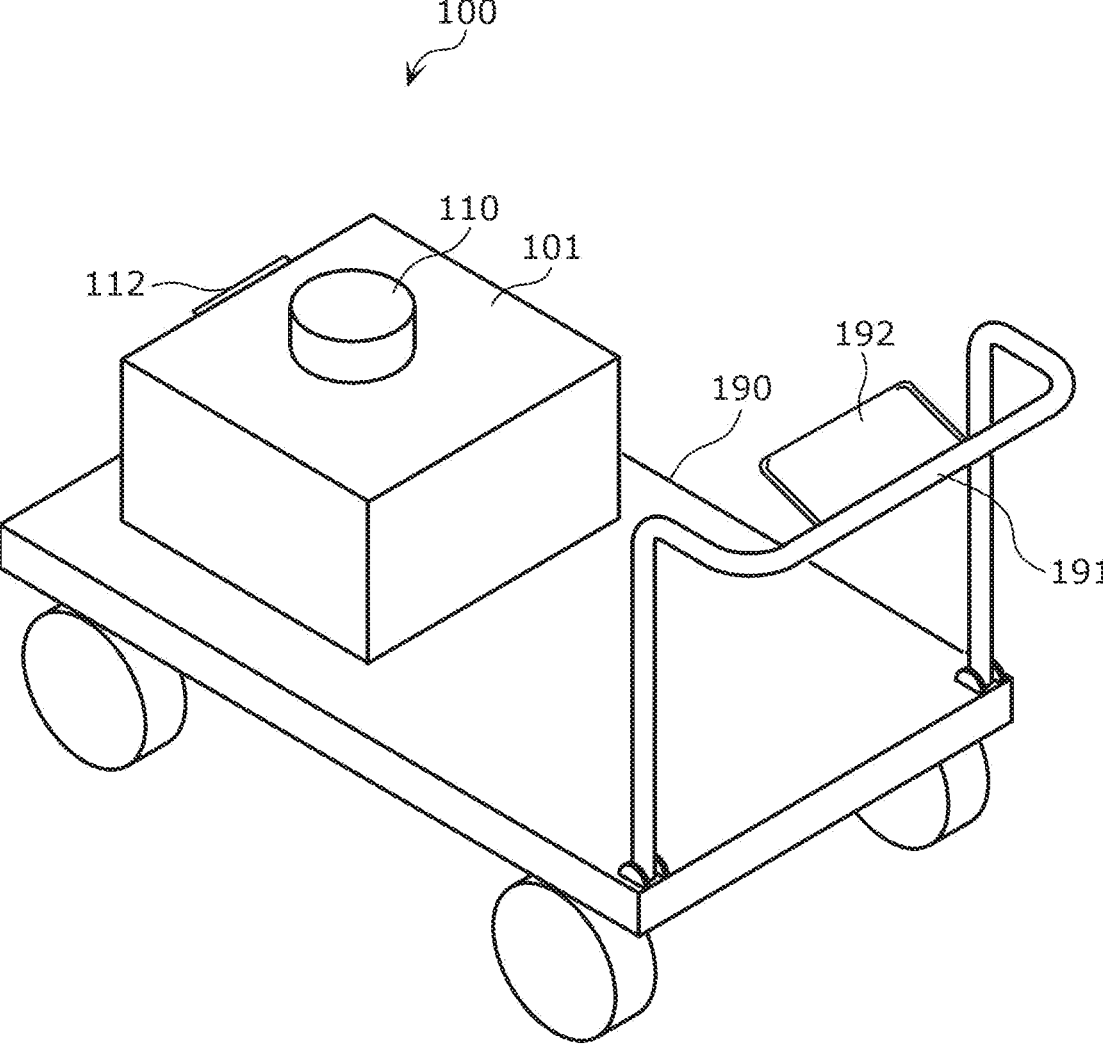
FIG. 2 is a perspective view of the travel map creating apparatus according to the embodiment viewed from diagonally above.
Figure 3:
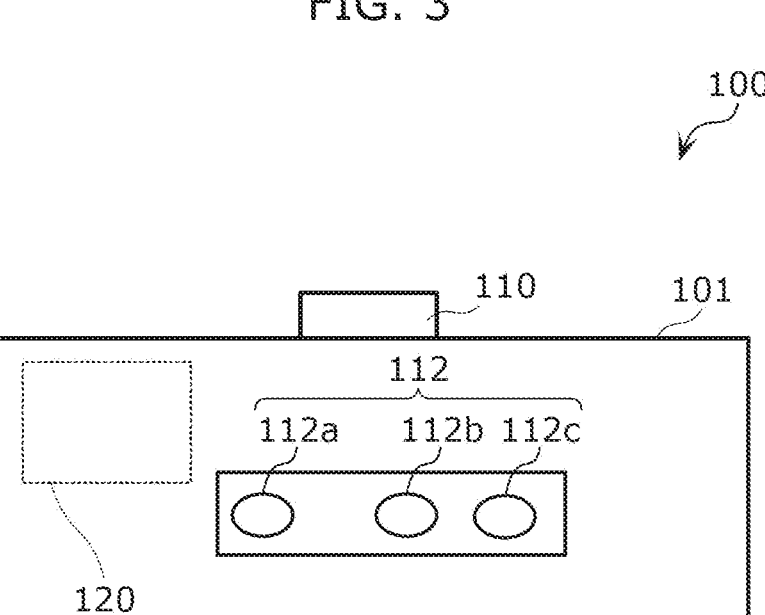
FIG. 3 is a front view of the travel map creating apparatus according to the embodiment viewed from the front.

First, travel map creating apparatus 100 will be described. FIG. 2 is a perspective view of travel map creating apparatus 100 according to the embodiment viewed from diagonally above. FIG. 3 is a front view of travel map creating apparatus 100 according to the embodiment viewed from the front.

Travel map creating apparatus 100 creates a travel map for autonomous mobile robot 300 that autonomously travels on a predetermined floor. More specifically, travel map creating apparatus 100 defines restricted areas to which the entry of autonomous mobile robot 300 is prohibited on the basis of a floor map, a self-position, and relative positions of markers while traveling on the predetermined floor in response to a user operation, and creates a travel map including the defined restricted areas.

For example, as illustrated in FIG. 2, travel map creating apparatus 100 may be loaded on hand cart 190 to travel on the predetermined floor in response to the user operation. In this example, a user pushes hand cart 190 to cause travel map creating apparatus 100 to travel. For example, hand cart 190 may be provided with handle 191 to which stand 192 for information terminal 200 is attached or on which a display (not illustrated) of travel map creating apparatus 100 is mounted. The display may be a so-called display panel.

Note that travel map creating apparatus 100 is not limited to the example illustrated in FIG. 2. For example, travel map creating apparatus 100 may include body 101 provided with a traveler including wheels and a motor for rotating the wheels to travel on the floor in response to operations performed using a remote control or the like. Moreover, for example, travel map creating apparatus 100 may further include a handle on body 101. In this case, the user may operate the handle to cause travel map creating apparatus 100 to travel.

Next, a configuration of travel map creating apparatus 100 will be described. As illustrated in FIG. 1, travel map creating apparatus 100 includes, for example, position sensor 110, imager 112, controller 120, storage 130, acceptor 140, notifier 150, and communicator 160. Configurations of the elements will now be described.

[Position Sensor]

Position sensor 110 detects objects around the travel map creating apparatus and obtains positional relationships of the objects relative to the travel map creating apparatus. For example, position sensor 110 is disposed in the center of the top surface of body 101 and obtains positional relationships, including distances and directions, between travel map creating apparatus 100 and objects, such as walls, around travel map creating apparatus 100. Position sensor 110 may be, for example, a LIDAR (Laser Imaging Detection And Ranging) system that emits light to detect the positional relationships on the basis of light reflected from obstacles, or may be a laser rangefinder. Position sensor 110 may have one or two light scanning axes to perform two-dimensional or three-dimensional measurements in a predetermined zone around travel map creating apparatus 100.

Note that travel map creating apparatus 100 may include sensors of other types in addition to position sensor 110. Travel map creating apparatus 100 may further include, for example, a floor surface sensor, an encoder, an accelerometer, an angular velocity sensor, a touch sensor, an ultrasound sensor, and a range sensor.

[Imager]

Imager 112 is an imaging device that images the surroundings of travel map creating apparatus 100. For example, imager 112 captures images including markers around travel map creating apparatus 100. The images may be one still image or a moving image. Imager 112 may be disposed on the front surface of body 101 or may be rotatably disposed on the top surface. Moreover, imager 112 may be composed of multiple cameras. Imager 112 may be, for example, a stereo camera or an RGB-D camera. RGB-D cameras obtain distance image data (depth) in addition to color image data (RGB). For example, in a case where imager 112 is an RGB-D camera as illustrated in FIG. 3, imager 112 may include RGB camera 112*a*, infrared sensor 112*b*, and projector 112*c*.

[Controller]

Controller 120 processes various information for controlling the operation of travel map creating apparatus 100. Specifically, controller 120 is achieved by a processor, a microcomputer, or a dedicated circuit. Moreover, controller 120 may be achieved by a combination of at least two selected from a processor, a microcomputer, or a dedicated circuit. For example, controller 120 includes obtainer 121, mode switcher 122, self-position calculator 123, floor map creator 124, marker identifier 125, marker position calculator 126, restricted access information generator 127, and travel map creator 128.

For example, obtainer 121 obtains the positional relationships of the surrounding objects relative to body 101 of travel map creating apparatus 100 obtained by position sensor 110. Moreover, obtainer 121 obtains the image data about the images captured by imager 112. Furthermore, in a case where travel map creating apparatus 100 includes sensors of other types in addition to position sensor 110, obtainer 121 may obtain sensor information obtained by the sensors of the other types.

Mode switcher 122 switches the operating mode of travel map creating apparatus 100. Specifically, mode switcher 122 switches the mode between a floor map creation mode in which a floor map is created and a marker identification mode in which markers are identified. For example, mode switcher 122 may switch the mode between the floor map creation mode and the marker identification mode according to an instruction to switch the mode accepted by acceptor 140. Acceptor 140 will be described in detail later. Moreover, for example, mode switcher 122 may switch the mode to the floor map creation mode when travel map creating apparatus 100 is traveling and to the marker identification mode when travel map creating apparatus 100 is at rest. In this manner, mode switcher 122 may switch the mode according to the instruction or may automatically switch the mode according to the movement (for example, traveling or at rest) of travel map creating apparatus 100.

Using the positional relationships obtained by position sensor 110 and the floor map created by floor map creator 124, self-position calculator 123 calculates a self-position that is the position of travel map creating apparatus 100 on the floor map. For example, self-position calculator 123 calculates the self-position using SLAM (Simultaneous Localization and Mapping) technology. Note that, in a case where travel map creating apparatus 100 uses the SLAM technology, self-position calculator 123 and floor map creator 124 creates the floor map while calculating the self-position, and updates the self-position and the floor map successively.

Floor map creator 124 creates the floor map that represents a predetermined floor. Floor map creator 124 creates the floor map on the basis of information about the positions of and the distances from the surrounding objects (that is, positional relationships) measured by position sensor 110. Floor map creator 124 may create a floor map regarding the surroundings (objects such as walls and furniture) of travel map creating apparatus 100 on the basis of the information (that is, the positional relationships) obtained by position sensor 110 using, for example, the SLAM technology. Note that, in addition to sensor information obtained by position sensor 110 (for example, LIDAR system), floor map creator 124 may add information from other sensors such as a wheel odometer and a gyroscope to create the floor map. Note that floor map creator 124 may obtain the floor map from information terminal 200 or a server (not illustrated), or may read out the floor map stored in storage 130, for example.

Marker identifier 125 identifies markers around body 101 of travel map creating apparatus 100. For example, marker identifier 125 detects markers included in sensor data obtained by position sensor 110 or imager 112 (for example, sensor data for measuring positional relationships or data including images). For example, marker identifier 125 may detect the markers by analyzing the images captured by imager 112 to identify the characteristics, such as the outlines, patterns, and colors, of the markers. Moreover, for example, marker identifier 125 may detect the markers by analyzing time series data about the intensity of reflection from the markers obtained by position sensor 110 to identify the characteristics, such as the outlines or patterns, of the markers. Moreover, for example, marker identifier 125 may refer to marker information stored in storage 130 to identify the markers or both the markers and the types of the markers on the basis of the marker information corresponding to the characteristics of the identified markers. The types of the markers will be described later.

Marker position calculator 126 calculates the relative positions of the markers to body 101 of travel map creating apparatus 100. For example, marker position calculator 126 calculates space information by projective transformation on the basis of vertices of the outlines of the markers identified by marker identifier 125. For example, marker position calculator 126 transforms the markers into predetermined rectangles by projective transformation on the basis of the positions of the markers and the distortions of the outlines of the markers in the images determined according to the angles and distances from the camera. Marker position calculator 126 then calculates viewing angles and transformation matrices (view matrices) to a camera coordinate system from marker coordinate systems that have the markers as the origins and planes with the markers located therein as the horizontal planes (XY planes). Note that the origin of each marker coordinate system is set to, for example, a predetermined vertex or the center of gravity of the corresponding rectangular marker. Moreover, calculation of such transformation matrices can be performed using known techniques or libraries. Information about the viewing angles may be obtained, for example, on the basis of information about a lens, included in imager 112 to be used, stored in advance. Moreover, instead of the transformation matrices from the marker coordinate systems to the camera coordinate system, transformation matrices to the marker coordinate systems relative to the camera coordinate system may be calculated.

Restricted access information generator 127 generates restricted access information indicating the restricted areas to which the entry of autonomous mobile robot 300 is prohibited on the basis of the floor map, the self-position, and the relative positions of the markers. For example, the self-position of travel map creating apparatus 100 on the floor map and the relative positions of the markers to travel map creating apparatus 100 are time-stamped. In this case, restricted access information generator 127 may refer to the time stamps to calculate the positions of the markers on the floor map (that is, coordinate information) on the basis of the self-position and the relative positions of the markers at the same points int time. On the basis of the positions of the multiple markers (coordinate information) calculated in this manner, restricted access information generator 127 may generate the restricted access information including boundary information that indicates boundaries between the restricted areas where the autonomous mobile robot cannot enter and travel areas (travelable areas) where the autonomous mobile robot can travel. Note that restricted access information generator 127 may determine the boundaries such that zones enclosed by the walls and the positions of the multiple markers, not only the positions of the markers, are defined as the restricted areas.

Furthermore, restricted access information generator 127 may generate the restricted access information corresponding to the types of the markers when the types of the markers are identified by marker identifier 125. The types of the markers may be at least one of a reflective marker, an identification marker, projector light, movements of bodies (so-called gestures), or the number of fingers. The types of the markers will be described in detail in fourth and fifth operation examples. The markers may include, for example, first markers for defining the boundaries and second markers that are different from the first markers and that do not define the boundaries. More specifically, the markers include, for example, the first markers, two first markers defining one boundary, and the second markers each defining a boundary that encloses a zone with a predetermined size and shape as a restricted area (for example, in (b) in FIG. 13, boundary 41a1 with a square U shape). The first markers are markers for, for example, defining the boundaries between the travelable areas and the restricted areas. The first markers are paired, and are used to define lines connecting the paired first markers as the boundaries. More specifically, in a case where one first marker is paired with only one other first marker adjacent to the one first marker in a first direction parallel to the wall near the one first marker or in a second direction perpendicular to the first direction in top view of the floor map, that is, there is only one pair of the one first marker and the other first marker, a line connecting the pair is defined as a boundary. The second markers are markers for, for example, defining the boundaries enclosing the restricted areas. The second markers are markers for, for example, defining boundaries enclosing zones with predetermined sizes and shapes as the restricted areas around obstacles (for example, objects, such as plant pots and fire extinguishers, that are difficult for position sensor 110 to detect) placed on a predetermined floor. For example, the second markers may define boundaries with polygonal shapes, such as triangles, quadrangles, and pentagons, or may define circular or elliptical boundaries. Moreover, for example, in a case where the second markers are attached to wall surfaces, the restricted areas may be zones with predetermined sizes and shapes enclosed by the wall surfaces and the boundaries defined by the second markers. For example, rectangular zones enclosed by the wall surfaces to which the second markers are attached and boundaries with square U shapes are so-called restricted areas. Note that the first markers and the second markers are mere examples and are not limited to these. For example, the entire surfaces of the first markers are made of materials with high intensity of reflection, whereas the second markers are made of materials with high intensity of reflection and materials with low intensity of reflection. The markers may be stickers, plates, or poles.

For example, restricted access information generator 127 may refer to a database storing the types of the markers or combinations of the types of the markers in association with the restricted access information to generate the restricted access information corresponding to the types of the markers. The restricted access information in association with the types of the markers includes, for example, the attributes of the boundaries or the accessible distances to the boundaries, and cannot be obtained by position sensor 110. The attributes of the boundaries are information indicating, for example, whether it is a spot autonomous mobile robot 300 should avoid entering or whether it is a spot autonomous mobile robot 300 is not allowed to enter. Furthermore, the spots autonomous mobile robot 300 is not allowed to enter may include additional information indicating, for example, whether it is a glass panel that is difficult for position sensor 110 to detect and whether it is a step, such as a stairstep.

Note that restricted access information generator 127 may correct the misalignment of multiple markers such that the marker boundaries become straight, may supplement boundaries between the starting and ending points and the walls, and may draw boundaries at a certain distance from the positions of the markers.

Travel map creator 128 creates a travel map including the restricted areas to which the entry of autonomous mobile robot 300 is prohibited on the basis of the restricted access information generated by restricted access information generator 127. Furthermore, travel map creator 128 may correct the travel map on the basis of the restricted access information corrected by restricted access information generator 127.

[Storage]

Storage 130 is a storage device that stores control programs and the like for controlling the operation of controller 120. For example, storage 130 may store the floor map created by floor map creator 124, the positional relationships obtained by position sensor 110, the relative positions of the markers calculated by marker position calculator 126, the database, the restricted access information generated by restricted access information generator 127, and the travel map created by travel map creator 128. Storage 130 is achieved by, for example, an HDD (Hard Disk Drive) or flash memory.

[Acceptor]

Acceptor 140 is a user interface that accepts instructions from a user. The user here is a user of the travel map creating apparatus and is a human or a robot. Acceptor 140 may be achieved by, for example, a touch panel, a display panel, hardware buttons, a camera, or a microphone. The display panel has the function of displaying images and the function of accepting manual inputs from the user, and accepts input operations to a numeric keypad image and the like displayed in the display panel, such as a liquid crystal panel or an organic EL (Electro Luminescence) panel. The microphone accepts voice inputs from the user.

For example, in a case where acceptor 140 accepts an input operation of an instruction to switch the mode, the instruction may be input to the touch panel when a mode switch tab displayed in the display panel is tapped. Moreover, for example, a mode switch instruction may be input when a microphone picks up voice "floor map creation mode" spoken by the user, or an instruction to switch to "marker identification mode" may be input when a camera captures an image of arms crossed on chest.

Although acceptor 140 here is an element of travel map creating apparatus 100, acceptor 140 may be integral to at least one of other elements of autonomous mobile robot system 400. For example, acceptor 140 may be integrated in information terminal 200, in a remote control (not illustrated), or in autonomous mobile robot 300.

[Notifier]

Notifier 150 uses at least one of sound, light, or images to notify the user that marker identifier 125 has identified the markers. Notifier 150 is achieved by, for example, at least one of a speaker, a lamp, or a display panel. The speaker outputs sound or voice. The lamp lights up or blinks. The display panel is a liquid crystal panel, an organic EL panel, or the like, and displays images.

[Communicator]

Communicator 160 is a communication circuit with which travel map creating apparatus 100 communicates with information terminal 200 and autonomous mobile robot 300 through network 10. For example, communicator 160 may send information terminal 200 an instruction to notify that marker identifier 125 has identified the markers. Moreover, for example, communicator 160 may send autonomous mobile robot 300 the travel map. Communicator 160 may include a communication circuit (communication module) for communicating through wide area networks and a communication circuit (communication module) for communicating through local area networks. Communicator 160 is, for example, a wireless communication circuit that communicates wirelessly. The communication standards for the communication performed by communicator 160 are not limited in particular.

[2-2. Information Terminal]

Next, information terminal 200 will be described. Information terminal 200 is, for example, a portable information terminal, such as a smartphone or a tablet computer owned by the user. However, information terminal 200 may be a floor-mounted information terminal, such as a personal computer. Moreover, information terminal 200 may be a terminal dedicated to autonomous mobile robot system 400. Information terminal 200 includes communicator 210, controller 220, notifier 230, acceptor 240, and storage 250. Configurations of the elements will now be described.

[Communicator]

Communicator 210 is a communication circuit with which information terminal 200 communicates with travel map creating apparatus 100 and autonomous mobile robot 300 through network 10. Communicator 210 may include a communication circuit (communication module) for communicating through wide area networks and a communication circuit (communication module) for communicating through local area networks. Communicator 210 is, for example, a wireless communication circuit that communicates wirelessly. The communication standards for the communication performed by communicator 210 are not limited in particular.

[Controller]

Controller 220 performs control over display of images on acceptor 240, identification of instructions input by the user (for example, voice recognition in a case of voice input), and the like. Controller 220 may be achieved by, for example, a microcomputer or a processor.

[Notifier]

Notifier 230 presents the user with notifications output from travel map creating apparatus 100 (in other words, notification information) and the travel map. Notifier 230 is achieved by, for example, at least one of a speaker, a lamp, or a display panel. The speaker outputs sound or voice. The lamp lights up or blinks. The display panel is a liquid crystal panel, an organic EL panel, or the like, and displays images.

[Acceptor]

Acceptor 240 accepts instructions from the user. More specifically, acceptor 240 accepts input operations for sending the user instructions to travel map creating apparatus 100. Acceptor 240 may be achieved by, for example, a touch panel, a display panel, hardware buttons, a camera, or a microphone. The touch panel may be, for example, a capacitive touch panel or a resistive touch panel. The display panel has the function of displaying images and the function of accepting manual inputs from the user, and accepts input operations to a numeric keypad image and the like displayed in the display panel, such as a liquid crystal panel or an organic EL (Electro Luminescence) panel. The microphone accepts voice inputs from the user.

[Storage]

Storage 250 is a storage device that stores application programs and the like executed exclusively by controller 220. Storage 250 is achieved by, for example, semiconductor memory.

[2-3. Autonomous Mobile Robot]

Next, autonomous mobile robot 300 will be described. For example, autonomous mobile robot 300 obtains the travel map created by travel map creating apparatus 100 and autonomously travels on a predetermined floor corresponding to the travel map. Autonomous mobile robot 300 is not limited in particular and may be any robot that autonomously travels. For example, autonomous mobile robot 300 may be a transport robot that transports goods and the like or a cleaning robot. The following describes an example where autonomous mobile robot 300 is a clearing robot.

Figure 4:
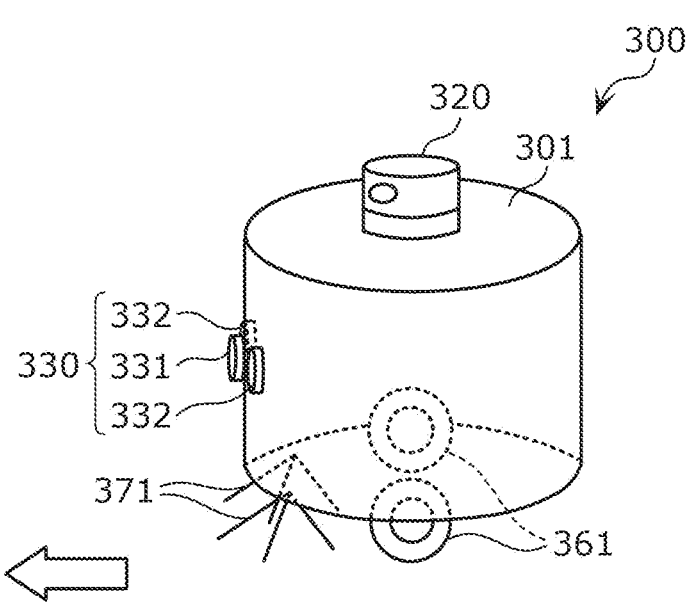
FIG. 4 is a perspective view of the external appearance of an autonomous mobile robot according to the embodiment viewed from a side.
Figure 5:
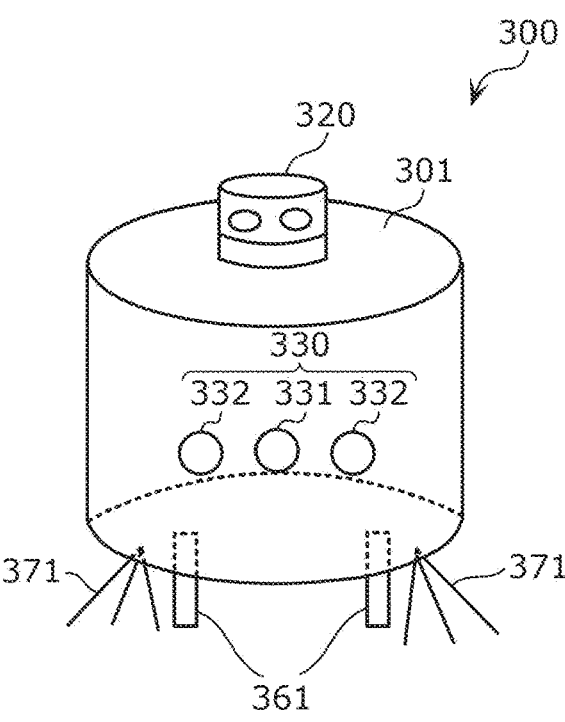
FIG. 5 is a perspective view of the external appearance of the autonomous mobile robot according to the embodiment viewed from the front.
Figure 6:
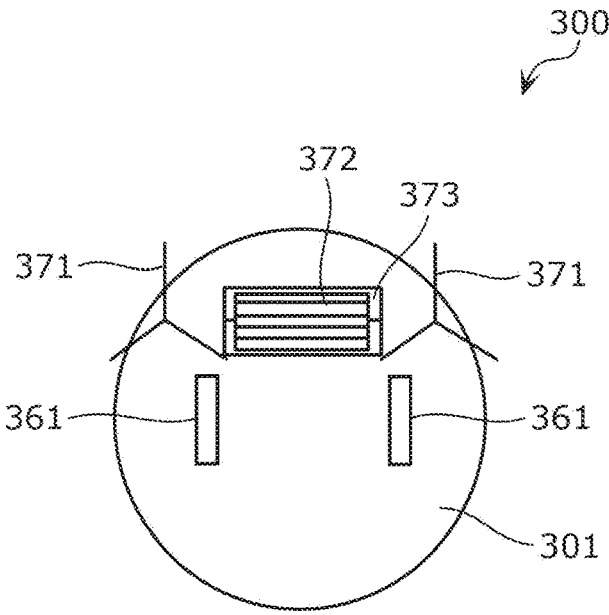
FIG. 6 is a bottom view of the external appearance of the autonomous mobile robot according to the embodiment viewed from below.

FIG. 4 is a perspective view of the external appearance of the autonomous mobile robot according to the embodiment viewed from a side. FIG. 5 is a perspective view of the external appearance of the autonomous mobile robot according to the embodiment viewed from the front. FIG. 6 is a bottom view of the external appearance of the autonomous mobile robot according to the embodiment viewed from below.

As illustrated in FIGS. 1 and 4 to 6, autonomous mobile robot 300 includes, for example, body 301 on which various elements are mounted, communicator 310, position sensor 320, obstacle sensor 330, controller 340, storage 350, traveler 360, and cleaner 370. Traveler 360 includes, for example, wheels 361 that move body 301. Cleaner 370 includes, for example, side brushes 371 and main brush 372 that clean dirt on the predetermined floor. Controller 340 processes various information regarding the operation of autonomous mobile robot 300. Controller 340 includes travel controller 345 that controls traveler 360 and cleaning controller 346 that controls cleaner 370. Body 301 is a casing that accommodates traveler 360, cleaner 370, controller 340, and the like.

[Traveler]

Traveler 360 causes autonomous mobile robot 300 to travel on the basis of instructions from travel controller 345. Traveler 360 includes wheels 361 that travel on the floor, a travel motor (not illustrated) that provides torque for wheels 361, a housing (not illustrated) that accommodates the travel motor, and the like. Moreover, autonomous mobile robot 300 may be of a two-wheel differential drive type with casters (not illustrated) that function as stabilizers. In this case, traveler 360 controls the rotation of wheels 361 in a pair of travel units separately to freely drive autonomous mobile robot 300 forward, backward, clockwise, counterclockwise, and the like.

[Cleaner]

Cleaner 370 draws dust on the floor from inlet 373 (see FIG. 6) into body 301 on the basis of instructions from cleaning controller 346 to hold the dust inside body 301. Cleaner 370 includes a brush rotation motor (not illustrated) that rotates side brushes 371 and main brush 372, a suction motor (not illustrated) that draws in dirt from inlet 373, a power transfer (not illustrated) that transfers power to the motors, a container (not illustrated) that holds the drawn dirt, and the like.

[Position Sensor]

Position sensor 320 is a sensor that detects objects around body 301 of autonomous mobile robot 300 and that obtains positional relationships of the objects relative to body 301. Position sensor 320 may be, for example, a LIDAR system that emits light to detect the positional relationships (for example, distances and directions from the body to the objects) on the basis of light reflected from obstacles, or may be a laser rangefinder.

For example, position sensor 320 is disposed in the center of the top surface of body 301 and obtains positional relationships, including distances and directions, between autonomous mobile robot 300 and objects, such as walls, around autonomous mobile robot 300. Position sensor 320 may be, for example, a LIDAR system that emits light to detect the positional relationships on the basis of light reflected from obstacles, or may be a laser rangefinder. Position sensor 320 may have one or two light scanning axes to perform two-dimensional or three-dimensional measurements in a predetermined zone around autonomous mobile robot 300.

[Obstacle Sensor]

Obstacle sensor 330 is a sensor that detects obstacles, such as surrounding walls and furniture, in front of body 301

(specifically, in the direction of travel) and preventing body 301 from traveling. In this embodiment, an ultrasound sensor is used as obstacle sensor 330. Obstacle sensor 330 includes transmitter 331 disposed in the center of the front side surface of body 301 and receivers 332 disposed on either side of transmitter 331. Receivers 332 receive ultrasonic waves emitted from transmitter 331 and reflected from obstacles, and thereby obstacle sensor 330 can detect the distances to the obstacles, the positions of the obstacles, and the like.

Note that autonomous mobile robot 300 may include sensors other than those described above. For example, autonomous mobile robot 300 may include floor surface sensors disposed at multiple points on the bottom surface of body 301 to determine whether a floor surface that is a floor exists. Moreover, autonomous mobile robot 300 may include an encoder included in traveler 360 to detect the rotation angles of the pair of wheels 361 rotated by the travel motor. Moreover, autonomous mobile robot 300 may include an accelerometer that detects the acceleration when autonomous mobile robot 300 travels and an angular velocity sensor that detects the angular velocity when autonomous mobile robot 300 turns. Moreover, autonomous mobile robot 300 may include a dust volume sensor that measures the volume of dust accumulating on the floor surface. Autonomous mobile robot 300 may include a touch sensor that detects the shift of a bumper (not illustrated) to detect collision with obstacles.

Next, a functional configuration of autonomous mobile robot 300 will be described with reference to FIG. 1. Descriptions of position sensor 320, obstacle sensor 330, traveler 360, and cleaner 370 will be omitted as those elements have been already described above. The following describes communicator 310, controller 340, and storage 350.

[Communicator]

Communicator 310 is a communication circuit with which autonomous mobile robot 300 communicates with travel map creating apparatus 100 and information terminal 200 through network 10. Communicator 310 may include a communication circuit (communication module) for communicating through wide area networks and a communication circuit (communication module) for communicating through local area networks. Communicator 310 is, for example, a wireless communication circuit that communicates wirelessly. The communication standards for the communication performed by communicator 310 are not limited in particular.

[Controller]

Controller 340 performs various operations on the basis of the travel map and sensor information obtained as position sensor 320 and obstacle sensor 330 sense the environment around autonomous mobile robot 300. Specifically, controller 340 is achieved by a processor, a microcomputer, or a dedicated circuit. Moreover, controller 340 may be achieved by a combination of at least two selected from a processor, a microcomputer, or a dedicated circuit. For example, controller 340 includes travel map obtainer 341, self-position calculator 342, travel plan creator 343, obstacle position calculator 344, travel controller 345, and cleaning controller 346.

Travel map obtainer 341 obtains the travel map created by travel map creating apparatus 100. For example, travel map obtainer 341 may obtain the travel map stored in storage 350 by reading out, or may obtain the travel map output from travel map creating apparatus 100 through communications.

For example, self-position calculator 342 calculates the self-position that is the position of body 301 of autonomous mobile robot 300 on the travel map on the basis of the travel map obtained by travel map obtainer 341 and the positional relationships of the surrounding objects relative to body 301 of autonomous mobile robot 300 obtained by position sensor 320.

Travel plan creator 343 creates a travel plan on the basis of the travel map and the self-position. For example, in the case where autonomous mobile robot 300 is a cleaning robot, travel plan creator 343 may further create a cleaning plan. The cleaning plan includes the cleaning order in which multiple cleaning areas on the predetermined floor are cleaned, travel routes and cleaning modes in the respective areas, and the like. The cleaning modes are, for example, combinations of the travel speed of autonomous mobile robot 300, suction power with which the dirt on the floor surface is drawn, and the rotational speeds of the brushes.

Note that, when obstacle sensor 330 detects an obstacle while autonomous mobile robot 300 is traveling according to the travel plan, travel plan creator 343 may change the travel plan on the basis of the position of the obstacle calculated by obstacle position calculator 344. At this moment, travel plan creator 343 may also change the cleaning plan.

Obstacle position calculator 344 obtains information about obstacles (for example, the distances to and the positions of the obstacles) detected by obstacle sensor 330 and calculates the positions of the obstacles on the floor map on the basis of the obtained information and the self-position calculated by self-position calculator 342.

Travel controller 345 controls traveler 360 such that autonomous mobile robot 300 travels according to the travel plan. More specifically, travel controller 345 processes information for controlling the operation of traveler 360 on the basis of the travel plan. For example, in addition to the travel plan, travel controller 345 derives control conditions for traveler 360 on the basis of the travel map and the information about the self-position and the like, and generates control signals for controlling the operation of traveler 360 on the basis of the control conditions. Travel controller 345 outputs the generated control signals to traveler 360. Note that details of the derivation of the control conditions for traveler 360 and the like are similar to those of known autonomous mobile robots and thus will be omitted.

Cleaning controller 346 controls cleaner 370 such that autonomous mobile robot 300 cleans according to the cleaning plan. More specifically, cleaning controller 346 processes information for controlling the operation of cleaner 370 on the basis of the cleaning plan. For example, in addition to the cleaning plan, cleaning controller 346 derives control conditions for cleaner 370 on the basis of the travel map and the information about the self-position and the like, and generates control signals for controlling the operation of cleaner 370 on the basis of the control conditions. Cleaning controller 346 outputs the generated control signals to cleaner 370. Note that details of the derivation of the control conditions for cleaner 370 and the like are similar to those of known autonomous cleaning robots and thus will be omitted.

[Storage]

Storage 350 is a storage device that stores the travel map, the sensor information sensed by position sensor 320 and obstacle sensor 330, computer programs executed by controller 340, and the like.

Storage 350 is achieved by, for example, semiconductor memory.

[3. Operation]

Next, the operation of travel map creating apparatus 100 according to the embodiment will be described with reference to the drawings.

First Example: Mode Switching According to Mode Switch Instruction

Figure 7:
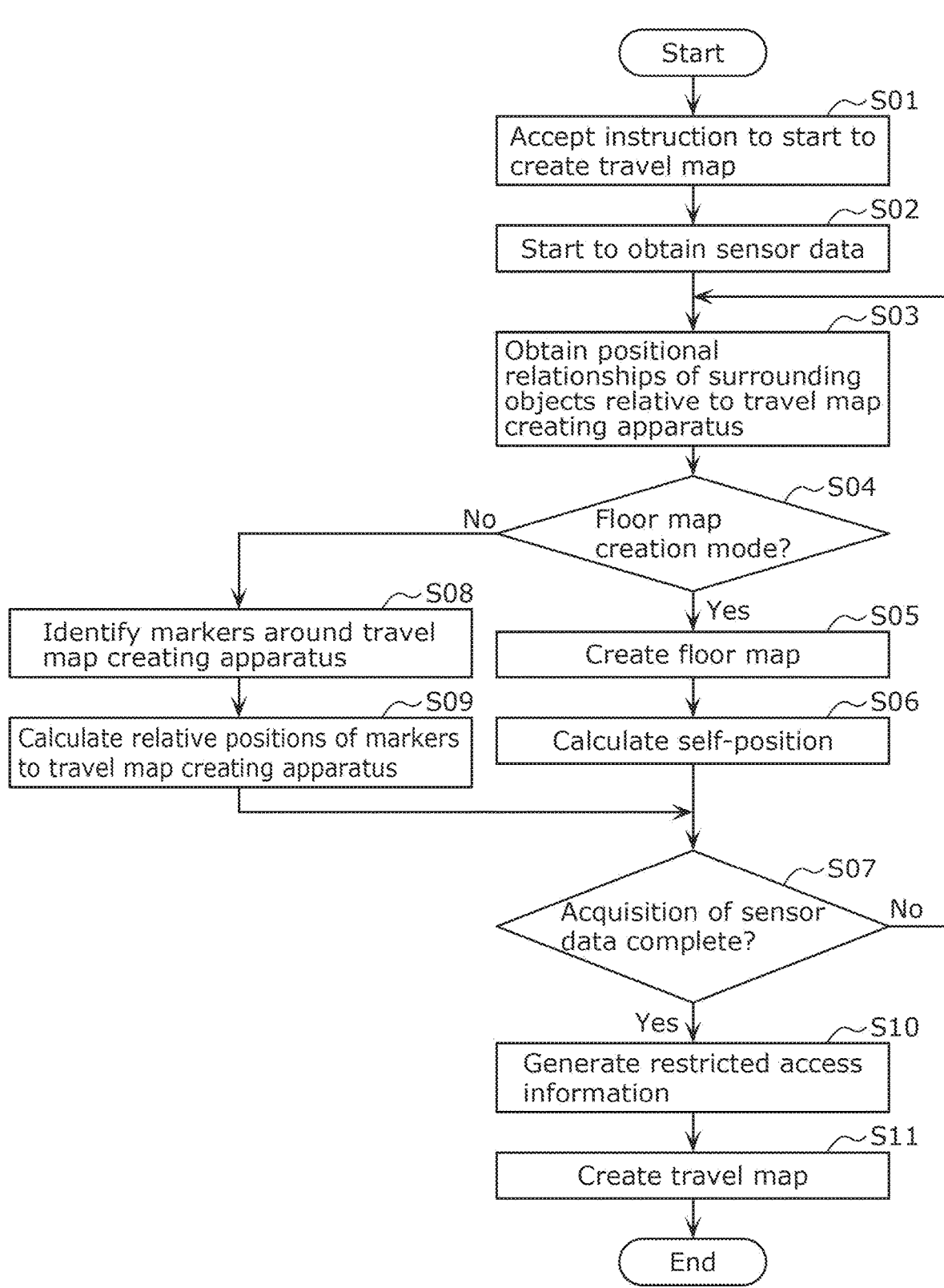
FIG. 7 is a flowchart illustrating a first example of an operation of the travel map creating apparatus according to the embodiment.

First, a first example of the operation of travel map creating apparatus 100 according to the embodiment will be described. FIG. 7 is a flowchart illustrating the first example of the operation of travel map creating apparatus 100 according to the embodiment. In the first example, travel map creating apparatus 100 switches between the floor map creation mode and the marker identification mode according to the mode switch instruction.

First, when acceptor 140 accepts an instruction to start to create a travel map (step S01), travel map creating apparatus 100 causes the multiple sensors, including position sensor 110, included in travel map creating apparatus 100 to start to obtain sensor data (step S02). More specifically, controller 120 in travel map creating apparatus 100 outputs an instruction to start to obtain sensor data to the multiple sensors including position sensor 110.

Upon receiving the instruction to start to obtain the sensor data, position sensor 110 detects objects around the travel map creating apparatus and obtains positional relationships of the surrounding objects relative to the travel map creating apparatus (step S03).

Controller 120 in travel map creating apparatus 100 determines whether acceptor 140 has accepted an instruction to start the floor map creation mode (step S04). When controller 120 determines that acceptor 140 has accepted the instruction to start the floor map creation mode (Yes in step S04), floor map creator 124 creates a floor map that represents a predetermined floor on the basis of the positional relationships of the surrounding objects relative to the travel map creating apparatus obtained by position sensor 110 in step S03 (step S05).

Next, self-position calculator 123 calculates the self-position that is the position of body 101 of travel map creating apparatus 100 on the floor map created by floor map creator 124 in step S05 (step S06). Although not illustrated, self-position calculator 123 stores the calculated self-position with a time stamp in storage 130.

On the other hand, when controller 120 determines that acceptor 140 has not accepted the instruction to start the floor map creation mode, for example, when controller 120 determines that acceptor 140 has accepted an instruction to switch the mode of the travel map creating apparatus from the floor map creation mode to the marker identification mode (No in step S04), marker identifier 125 identifies markers around the travel map creating apparatus (step S08).

Next, marker position calculator 126 calculates the relative positions of the markers, identified by marker identifier 125 in step S08, to the travel map creating apparatus (here, the body of travel map creating apparatus 100; step S09). Although not illustrated, marker position calculator 126 stores in storage 130 the calculated relative positions of the markers with time stamps.

Following step S06 or step S09, controller 120 determines whether the acquisition of the sensor data has been completed (step S07). When controller 120 determines that the acquisition has not been completed (No in step S07), the process returns to step S03. On the other hand, when controller 120 determines that the acquisition of the sensor data has been completed (Yes in step S07), restricted access information generator 127 generates restricted access information indicating restricted areas to which the entry of autonomous mobile robot 300 is prohibited on the basis of the floor map created in step S05, the self-position calculated in step S06, and the relative positions of the markers calculated in step S09 (step S10). For example, restricted access information generator 127 may refer to the time of the time stamp attached to the self-position and the time of the time stamps attached to the relative positions of the markers to calculate the positions of the markers on the floor map (that is, coordinate information) on the basis of the self-position and the relative positions of the markers at the same points in time. On the basis of the positions of the multiple markers (coordinate information) calculated in this manner, restricted access information generator 127 may generate the restricted access information including boundary information that indicates boundaries between the restricted areas where the autonomous mobile robot cannot enter and travel areas (travelable areas) where the autonomous mobile robot can travel. Note that restricted access information generator 127 may determine the boundaries such that zones enclosed by the walls and the positions of the multiple markers, not only the positions of the markers, are defined as the restricted areas.

Next, travel map creator 128 creates a travel map including the restricted areas on the basis of the restricted access information generated by restricted access information generator 127 in step S10 (step S11).

When the creation of the travel map is complete, travel map creating apparatus 100 stops operating. Note that travel map creating apparatus 100 may stop operating in a case where notifier 150 notifies a user that the process in step S11 (that is, the travel map creation process) has been completed and where acceptor 140 has accepted an instruction to stop operating.

Thus, travel map creating apparatus 100 can switch between the floor map creation mode and the marker identification mode, causing the markers not to be identified during the floor map creation mode. Accordingly, for example, travel map creating apparatus 100 does not detect changes in the self-position while travel map creating apparatus 100 is not moving caused by identification of markers (for example, markers being carried to placement points). As a result, travel map creating apparatus 100 can eliminate or minimize the distortion of the map caused by the changes in the self-position, thereby being able to create the travel map accurately.

Second Example: Reflection or Maintaining of Marker Positions Depending on Whether Body is Moving Next, a second example of the operation of travel map creating apparatus 100 according to the embodiment will be described. FIG. 8 is a flowchart illustrating the second example of the operation of travel map creating apparatus 100 according to the embodiment. In FIG. 8, the same processes as those in FIG. 7 are given the same step numbers. In the description below, differences from the first example will be mainly described, and duplicate contents will be simplified or omitted.

In the first example, travel map creating apparatus 100 switches between the floor map creation mode and the marker identification mode according to the mode switch instruction. The marker identification process is stopped in the floor map creation mode, whereas the floor map creation process is stopped in the marker identification mode. In the second example, unlike the first example, the marker identification process is not stopped in the floor map creation mode, and the positions of the identified markers are reflected in the floor map or not depending on whether the body of travel map creating apparatus 100 is moving (that is, whether it is traveling or at rest).

In the second example, as in the first example, when it is determined that the instruction to start the floor map creation mode is accepted (Yes in step S04), the floor map is created (step S05), and the self-position is calculated (step S06). Next, marker identifier 125 identifies the markers around the travel map creating apparatus (here, body 101 of travel map creating apparatus 100; step S21), and marker position calculator 126 calculates the relative positions of the identified markers to the travel map creating apparatus (step S22).

Next, controller 120 determines whether travel map creating apparatus 100 is traveling (step S23). Upon determining that travel map creating apparatus 100 is traveling (Yes in step S23), controller 120 causes marker position calculator 126 to store in storage 130 the relative positions of the markers with a flag indicating not to reflect the relative positions in the floor map (step S24). The process then proceeds to step S07.

On the other hand, upon determining that travel map creating apparatus 100 is not traveling, in other words, at rest (No in step S23), controller 120 causes marker position calculator 126 to store in storage 130 the relative positions of the markers with a flag indicating to reflect the relative positions in the floor map (step S25). The process then proceeds to step S07. In step S23, for example, in a case where controller 120 detects a phenomenon in which the self-position is moving although the wheel odometer is not operating, controller 120 may determine that body 101 of travel map creating apparatus 100 is not traveling (that is, at rest).

As described above, in the case where travel map creating apparatus 100 identifies the markers in the floor map creation mode, travel map creating apparatus 100 can determine whether to reflect the relative positions of the identified markers in the floor map depending on whether travel map creating apparatus 100 is moving (traveling). According to this, even when the markers are identified during the floor map creation mode, the identified markers can be reflected in the floor map in the case where it is determined that travel map creating apparatus 100 is not moving when the markers are identified. Accordingly, the markers can be efficiently identified during the creation of the floor map. Thus, travel map creating apparatus 100 can create the travel map in a simpler manner.

Third Example: Automatic Mode Switching

Figure 9:
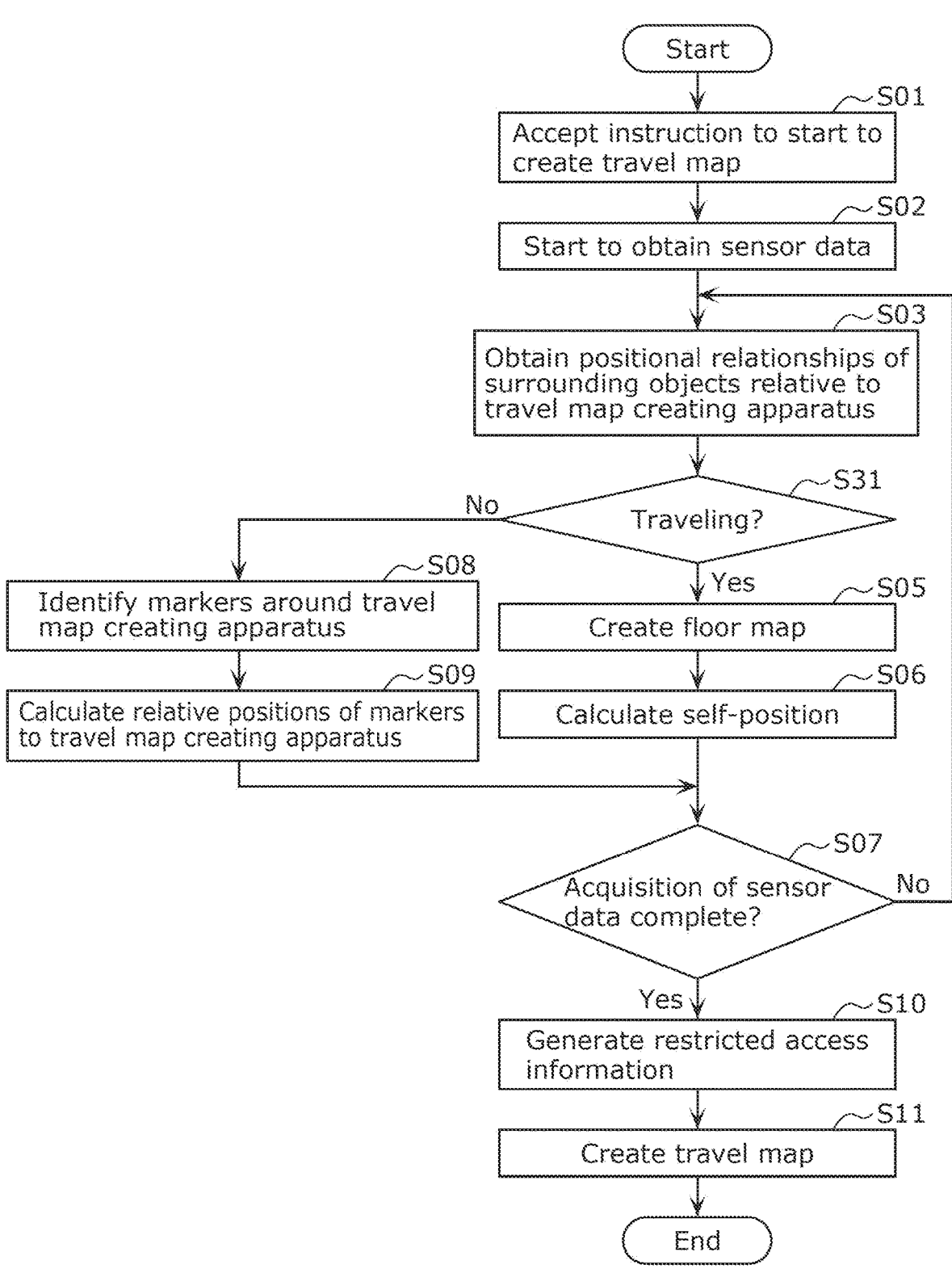
FIG. 9 is a flowchart illustrating a third example of the operation of the travel map creating apparatus according to the embodiment.

Next, a third example of the operation of travel map creating apparatus 100 according to the embodiment will be described. FIG. 9 is a flowchart illustrating the third example of the operation of travel map creating apparatus 100 according to the embodiment. In FIG. 9, the same processes as those in FIG. 7 are given the same step numbers. In the description below, differences from the first example will be mainly described, and duplicate contents will be simplified or omitted.

In the first example, travel map creating apparatus 100 switches between the floor map creation mode and the marker identification mode according to the mode switch instruction. In the third example, unlike the first example, travel map creating apparatus 100 automatically switches between the floor map creation mode and the marker identification mode depending on whether the body of travel map creating apparatus 100 is moving (that is, whether it is traveling or at rest).

In the third example, after position sensor 110 obtains the positional relationships of the surrounding objects relative to the travel map creating apparatus in step S03, controller 120 in travel map creating apparatus 100 determines whether travel map creating apparatus 100 is traveling (step S31). In a case where changes in the self-position are detected while the wheel odometer is operating, for example, controller 120 determines that travel map creating apparatus 100 is traveling (Yes in step S31), and switches the mode of the travel map creating apparatus to the floor map creation mode (not illustrated). The process then proceeds to the same steps as those in the first example illustrated in FIG. 7 (specifically, to steps S05 and S06). On the other hand, in a case where changes in the self-position are detected although the wheel odometer is not operating, for example, controller 120 determines that travel map creating apparatus 100 is not traveling (in other words, at rest; No in step S31), and switches the mode to the marker identification mode (not illustrated). The process then proceeds to the same steps as those in the first example illustrated in FIG. 7 (specifically, to steps S08 and S09).

Thus, travel map creating apparatus 100 can automatically switch between the floor map creation mode and the marker identification mode, saving the user time and effort. Accordingly, travel map creating apparatus 100 can create the travel map in a simpler manner.

Figure 10:
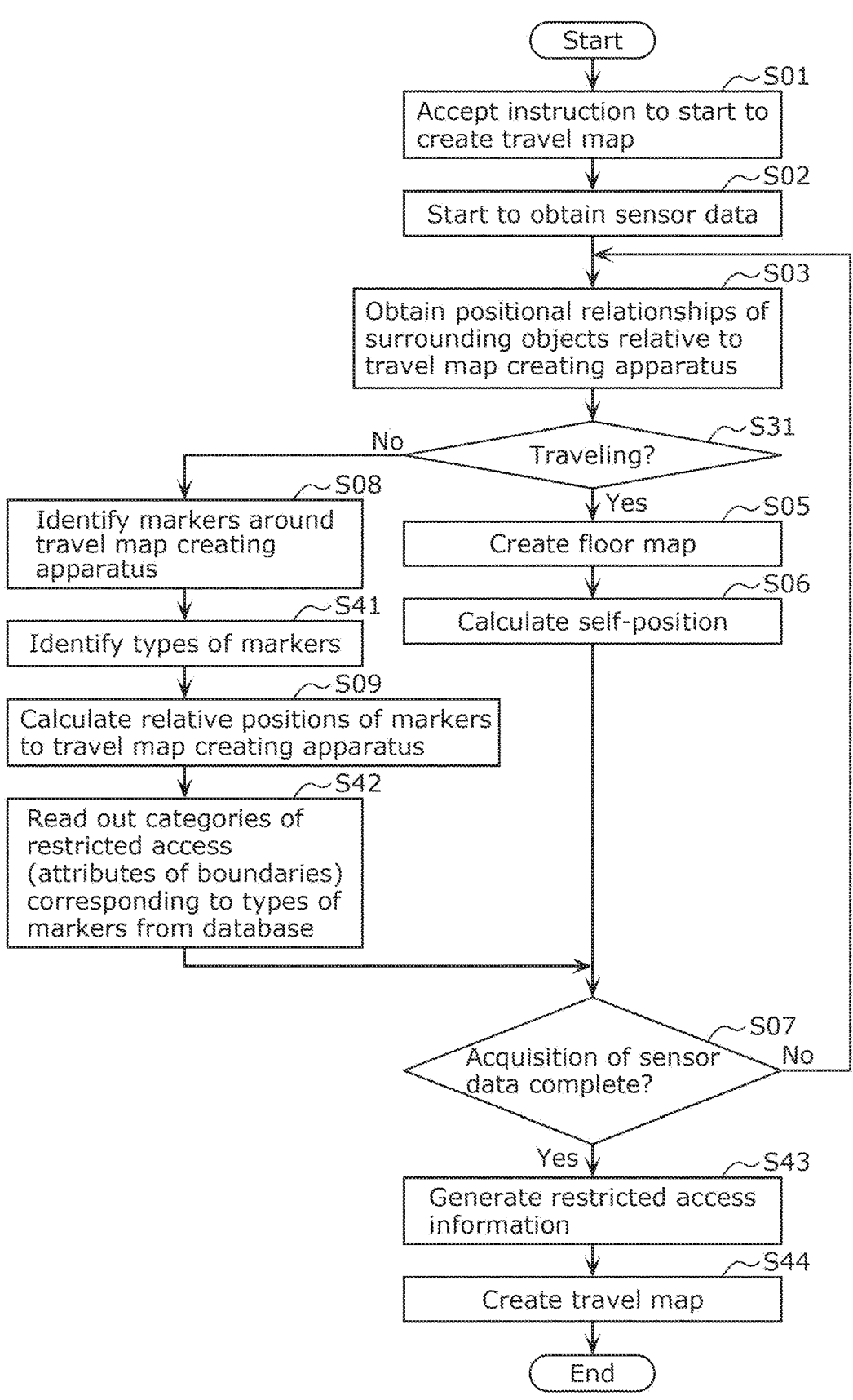
FIG. 10 is a flowchart illustrating a fourth example of the operation of the travel map creating apparatus according to the embodiment.

Fourth Example: Identification of Types of Markers in Addition to Identification of Markers Next, a fourth example of the operation of travel map creating apparatus 100 according to the embodiment will be described. FIG. is a flowchart illustrating the fourth example of the operation of travel map creating apparatus 100 according to the embodiment. In FIG. 10, the same processes as those in FIG. 9 are given the same step numbers. In the description below, differences from the third example will be mainly described, and duplicate contents will be simplified or omitted.

In the third example, travel map creating apparatus 100 switches between the floor map creation mode and the marker identification mode depending on whether travel map creating apparatus 100 is traveling or at rest, and generates the restricted access information on the basis of the floor map, the self-position, and the relative positions of the markers identified in the marker identification mode. In the fourth example, unlike the third example, travel map creating apparatus 100 further identifies the types of the markers in the marker identification mode and generates the restricted access information corresponding to the types of the identified markers (for example, restricted access information including the attributes of the boundaries).

After position sensor 110 obtains the positional relationships of the surrounding objects relative to the travel map creating apparatus in step S03, controller 120 in travel map creating apparatus 100 determines whether travel map creating apparatus 100 is traveling (step S31). When controller 120 determines that travel map creating apparatus 100 is not traveling (No in step S31), marker identifier 125 identifies the markers around the travel map creating apparatus (step S08). Then, marker identifier 125 further identifies the types of the markers (step S41). Any identifiers using identification methods appropriate for the types of the markers may be used as marker identifier 125.

The types of the markers may be, for example, at least one of a reflective marker, an identification marker, projector light, movements of bodies (so-called gestures), or the number of fingers. The reflective marker is, for example, a reflector and may be a retroreflector that strongly reflects light in the direction of incident light. The reflective marker may also be, for example, a reflective film. The reflective marker is not limited to a reflector and may be any object including a reflector. In the latter case, the reflective marker may be, for example, a glove with a reflector, such as a reflective film, attached to the palm part of the glove, or may be a garment with a reflector attached to a part of the garment (for example, front part of a thigh). Moreover, the reflective marker may be a reflective pole or a reflective plate. The identification marker may be, for example, a two-dimensional barcode, an IC tag, a Bluetooth (registered trademark) tag, an RFID tag, an AR marker, or a QR Code (registered trademark). The projector light is, for example, light emitted from a laser pointer or light or images projected by a light projecting device, such as a projector. The movements of bodies are not limited to those of humans and may be those of robots. For example, the movements include curling fingers and thumbs tightly (clenching fists), stretching out fingers and thumbs (opening hands), waving hands, turning palms over, or shaking index fingers from side to side. Any of these movements may indicate the starting and ending points of the boundaries of the restricted areas, may indicate instructions to fill the gaps between the markers that indicate the starting and ending points and the walls adjacent to the markers, or may indicate instructions on which sides of the markers are defined as the restricted areas. Moreover, the number of fingers that are held up, that is, 1, 2, 3, 4, 5, . . . may indicate the order in which the boundaries of the restricted areas are drawn. Moreover, combinations of these types of markers may indicate, for example, that there are wall surfaces made of materials, such as glass, that are difficult for the position sensor to detect (glass panels); that there are stepped parts; that there are spots with a lot of people coming and going, such as elevators; or that there are obstacles, such as fire extinguishers or plant pots, that are difficult for the obstacle sensor to detect.

Next, marker position calculator 126 calculates the relative positions of the markers to the travel map creating apparatus (here, body 101 of travel map creating apparatus 100; step S09). Marker position calculator 126 reads the categories of restricted access (for example, the attributes of the boundaries) corresponding to the types of the markers identified by marker identifier 125 out of the database in storage 130 (step S42). Marker position calculator 126 then stores in storage 130 the calculated relative positions of the markers in association with the categories of the restricted access read out of the database. This causes each of the relative positions of the multiple markers to be associated with information, for example, that the boundaries are linearly interpolated, that the boundaries are supplemented between the starting and ending points and the walls adjacent to the points, that the near sides or the far sides of the boundaries are defined as the restricted areas, or that the material is glass.

Next, controller 120 determines whether the acquisition of the sensor data has been completed (step S07). When it is determined that the acquisition has not been completed (No in step S07), the process returns to step S03. On the other hand, when controller 120 determines that the acquisition of the sensor data has been completed (Yes in step S07), restricted access information generator 127 generates the restricted access information indicating the restricted areas corresponding to the types of the markers on the basis of the floor map created in step S05, the self-position calculated in step S06, and the relative positions of the markers in association with the categories of the restricted access in step S42 (step S43).

Next, travel map creator 128 creates the travel map including the restricted areas on the basis of the restricted access information corresponding to the types of the markers generated by restricted access information generator 127 in step S43 (step S44). The description of the end of the operation will be omitted as it has been already provided.

As described above, additional identification of the types of the markers by marker identifier 125 allows travel map creating apparatus 100 to include the information about the restricted areas (for example, information that there are glass panels, spots with a lot of people coming and going, or obstacles) in the travel map. Thus, travel map creating apparatus 100 can save the user the trouble of adding the information to the travel map, creating the travel map in a simpler manner.

Note that, in the first to fourth examples, the self-position and the relative positions of the markers may be calculated from the sensor data obtained by position sensor 110 and imager 112 (for example, an RGB-D camera). Moreover, marker identifier 125 may identify the markers on the basis of the sensor data obtained by position sensor 110 (the positional relationships of the objects relative to the travel map creating apparatus) or may identify the markers using predetermined methods corresponding to the types of the markers.

Fifth Example: Definition of Boundaries

Figure 11:
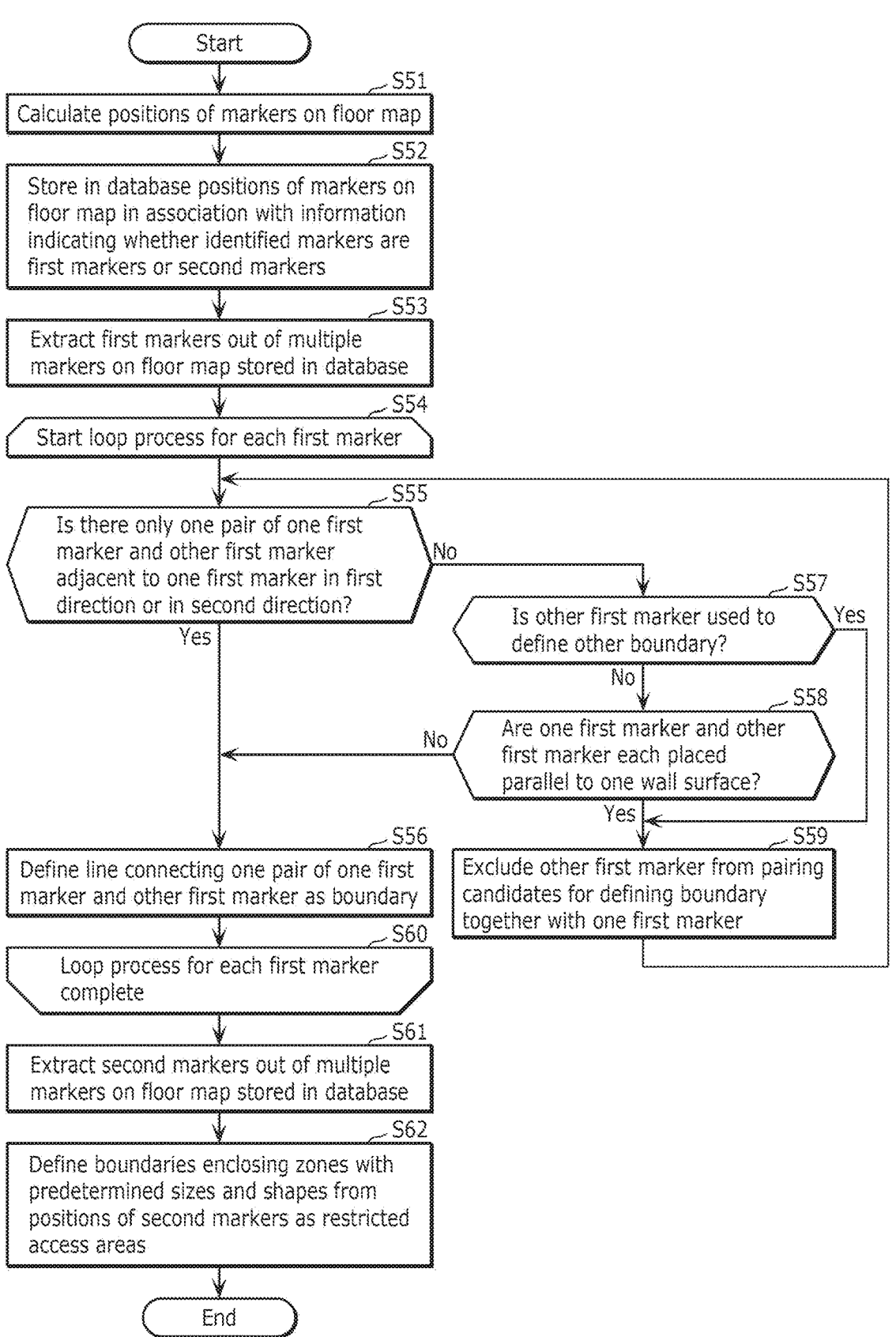
FIG. 11 is a flowchart illustrating a fifth example of the operation of the travel map creating apparatus according to the embodiment.

Next, a fifth example of the operation of travel map creating apparatus 100 according to the embodiment will be described. FIG. 11 is a flowchart illustrating the fifth example of the operation of travel map creating apparatus 100 according to the embodiment. In the fourth example, information about the restricted areas (for example, information that there are glass panels, spots with a lot of people coming and going, or obstacles) is included in the travel map on the basis of the restricted access information corresponding to the types of the markers. In the fifth example, boundaries between travelable areas and restricted areas are defined on the basis of the types of the markers and the placement positions of the markers. Note that the identification of the types of the markers in the fifth example may be performed in the marker identification process (for example, in step S08 in FIGS. 7, 8, and 9) or may be performed in the marker type identification process (in step S41 in FIG. 10). In the example below, the identification of the types of the markers is performed in step S08.

Note that the example of the boundary definition process illustrated in FIG. 11 may be applied to the boundary definition process in step S10 in FIGS. 7, 8, and 9 or in step S43 in FIG. 10.

In the description below, the markers include, for example, first markers and second markers that are different from the first markers, although the markers may include only the first markers. For example, the first markers are markers for defining the boundaries between the travelable areas and the restricted areas. For example, the second markers are markers for defining the boundaries enclosing the restricted areas.

As illustrated in FIG. 11, restricted access information generator 127 calculates the positions of the markers on the floor map on the basis of the floor map, the self-position, and the relative positions of the markers (step S51). Restricted access information generator 127 defines the boundaries between the travelable areas where autonomous mobile robot 300 can travel and the restricted areas where autonomous mobile robot 300 cannot enter, and generates the restricted access information including the boundary information that indicates the defined boundaries. For example, restricted access information generator 127 may refer to the time of the time stamp attached to the self-position and the time of the time stamps attached to the relative positions of the markers to calculate the positions of the markers on the floor map (that is, coordinate information) on the basis of the self-position and the relative positions of the markers at the same points in time. On the basis of the positions of the markers (coordinate information) calculated in this manner, restricted access information generator 127 may generate the restricted access information including the boundary information that indicates the boundaries between the travelable areas where autonomous mobile robot 300 can travel and the restricted areas where autonomous mobile robot 300 cannot enter.

Next, restricted access information generator 127 stores in the database (not illustrated) in storage 130 the positions of the markers on the floor map calculated in step S51 in association with the information indicating the types of the markers identified in step S08 (specifically, information whether the identified markers are either the first markers or the second markers; step S52).

Upon completing the process in step S52 for all the identified markers, restricted access information generator 127 extracts the first markers out of the multiple markers on the floor map stored in the database (not illustrated; step S53).

Next, restricted access information generator 127 starts a loop process for each first marker (step S54). Restricted access information generator 127 determines whether one first marker is paired with only one other first marker adjacent to the one first marker in a first direction parallel to the wall near the one first marker or in a second direction perpendicular to the first direction in top view of the floor map (step S55). Upon determining that the one first marker is paired only with the other first marker, that is, there is only one pair of the one first marker and the other first marker (Yes in step S55), restricted access information generator 127 defines a line connecting the pair as a boundary (step S56).

On the other hand, upon determining that the one first marker can be paired with two other first markers adjacent to the one first marker in the first direction or in the second direction in top view of the floor map (No in step S55), restricted access information generator 127 determines whether the other first markers are used to define other boundaries (step S57).

For example, restricted access information generator 127 determines that the one first marker can be paired with two other first markers adjacent to the one first marker in the first direction or in the second direction in top view of the floor map (i) in a case where, out of the first markers extracted from the database, the one first marker can be paired with two other first markers, both the other first markers being adjacent to the one first marker in the first direction or in the second direction in top view of the floor map or (ii) in a case where the one first marker can be paired with at least one other first marker adjacent to the one first marker in the first direction and at least one other first marker adjacent to the one first marker in the second direction in top view of the floor map. Note that the sentence "one first marker is adjacent to an other first marker" means that, out of multiple other first markers on a straight line including the one first marker, the other first marker lies next to the one first marker in the first direction or in the second direction. That is, between two adjacent first markers (that is, one first marker and an other first marker), no first markers other than the two exist.

In step S57, for each of the other first markers, upon determining that the other first marker is used to define an other boundary (Yes in step S57), restricted access information generator 127 excludes each other first marker from pairing candidates for defining boundaries together with the one first marker (step S59). On the other hand, upon determining that the other first marker is not used to define an other boundary (No in step S57), restricted access information generator 127 determines whether the one first marker and the other first marker are placed parallel to one wall surface (step S58).

Figure 12:
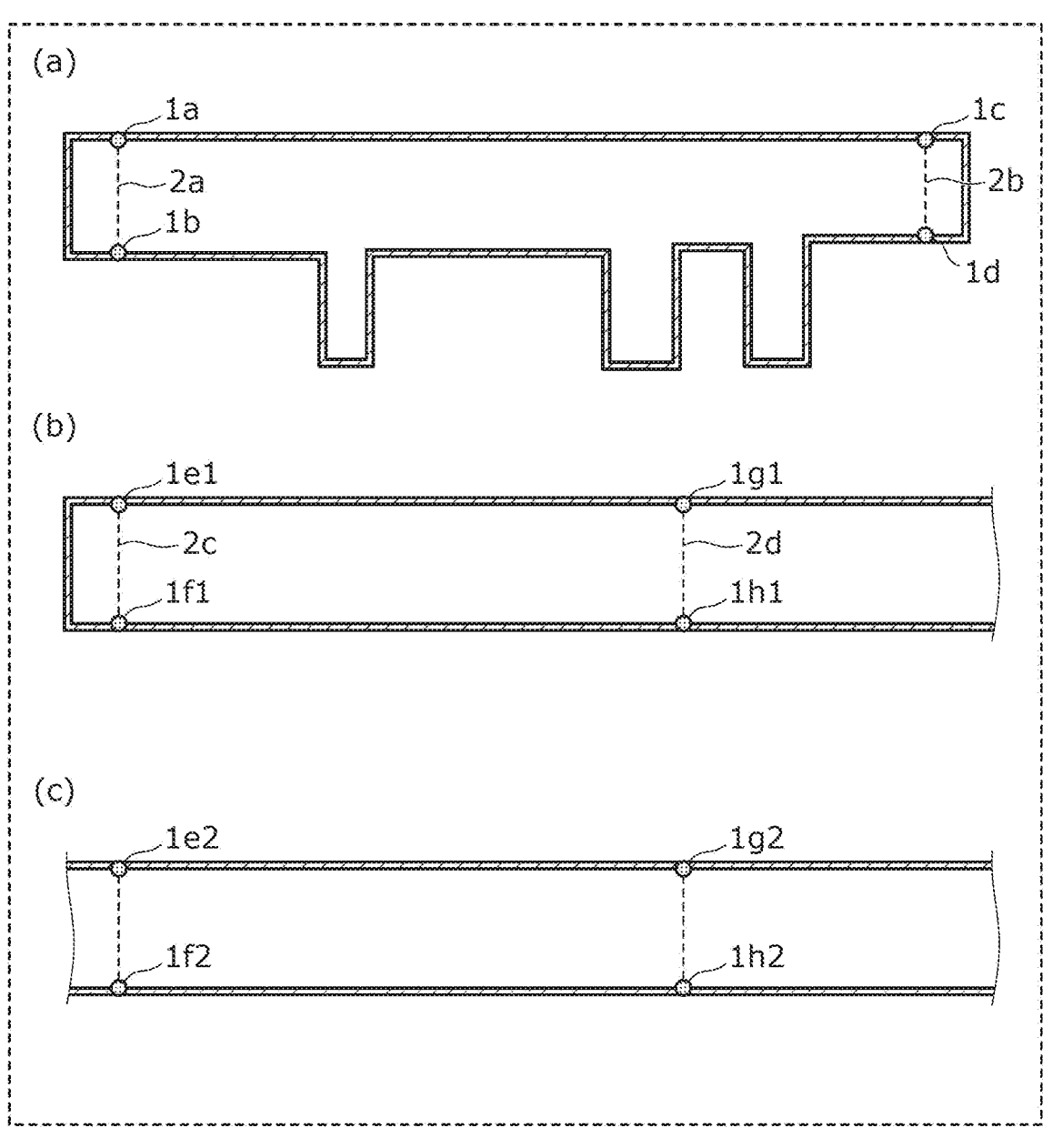
FIG. 12 schematically illustrates an example of a boundary definition process based on first markers.

Here, the process in step S58 will be described specifically with reference to FIGS. 11 and 12. FIG. 12 schematically illustrates an example of the boundary definition process based on the first markers.

The sentence "one first marker and an other first marker are each placed parallel to one wall surface on a predetermined floor" means that the one first marker and the other first marker are attached to one wall surface or placed in front of one wall surface along the wall surface. In the former case, the first markers are, for example, stickers or plates attached to the wall surface. In the latter case, the first markers are, for example, poles placed on a floor surface. As described above, the other first markers are pairing candidates that can be paired with the one first marker and are adjacent to the one first marker in the first direction parallel to the wall near the one first marker or in the second direction perpendicular to the first direction in top view of the floor map.

Note that the one wall surface is one surface. With reference to (a) in FIG. 12, a wall surface to which first marker 1*a* and first marker 1*c* are attached is one wall surface. On the other hand, a wall surface to which first marker 1*b* is attached and a wall surface to which first marker 1*d* is attached are different wall surfaces.

As illustrated in FIG. 11, upon determining that the one first marker and the other first marker are placed parallel to one wall surface (Yes in step S58), restricted access information generator 127 excludes each other first marker from the pairing candidates for defining boundaries together with the one first marker (step S59). On the other hand, upon determining that the one first marker and the other first marker are not placed parallel to one wall surface (No in step S58), restricted access information generator 127 executes the process in step S56.

Here, the process in steps S58 and S59 will be described specifically with reference to (a) in FIG. 12. First, restricted access information generator 127 identifies first marker 1*b* and first marker 1*c* as two other first markers that can be paired with first marker 1*a* (in other words, pairing candidates), first marker 1*c* being adjacent to first marker 1*a* in a first direction parallel to the wall near first marker 1*a* (here, first direction that is parallel to the wall closest to the placement position of first marker 1*a* and that is an axial direction including the placement position of first marker 1*a*) in top view of the floor map, first marker 1*b* being adjacent to first marker 1*a* in a second direction perpendicular to the first direction (here, second direction that is perpendicular to the first direction and that is an axial direction including the placement position of first marker 1*a*) in top view of the floor map. As illustrated in (a) in FIG. 12, out of the two identified pairs, the pair of first marker 1*a* and first marker 1*c* is placed along one wall (in other words, parallel to one wall surface). In this manner, restricted access information generator 127 determines that first marker 1*a* and first marker 1*c* are placed parallel to one wall surface on the basis of the positional relationships among first marker 1*a*, first marker 1*c*, and the wall on the floor map.

As illustrated in FIG. 11, after excluding other first marker 1*c* that is determined to be placed parallel to the one wall surface in step S58 from the pairing candidates (step S59), restricted access information generator 127 returns to the process in step S55. With reference to (a) in FIG. 12, in the process in step S55, for example, restricted access information generator 127 determines that the pair of first marker 1*a* and other first marker 1*b* is the only pair of first marker 1*a* and the pairing candidate (Yes in step S55), and defines line 2*a* connecting first marker 1*a* and other first marker 1*b* as a boundary (step S56).

After the process on first marker 1*a* is complete, restricted access information generator 127 executes the process in step S55 on first marker 1*c*. Because first marker 1*c* can be paired only with first marker 1*d* (Yes in step S55), restricted access information generator 127 determines that there is only one pair of first marker 1*c* and other first marker 1*d* adjacent to first marker 1*c* in the second direction in top view of the floor map (Yes in step S55), and defines line 2*b* connecting first marker 1*c* and first marker 1*d* as a boundary (step S56).

Next, when the loop process for each first marker is complete (step S60), restricted access information generator 127 extracts the second markers out of the multiple markers on the floor map stored in the database (not illustrated; step S61).

Next, restricted access information generator 127 defines boundaries enclosing zones with predetermined sizes and shapes from the positions of the second markers on the floor map as the restricted areas (step S62). The boundary definition process will be described later using a specific example.

Thus, travel map creating apparatus 100 executes the process using the first markers and the process using the second markers to define the boundaries. This allows the boundaries to be defined on the travel map in a simpler and more accurate manner. Accordingly, travel map creating apparatus 100 can easily define the restricted areas to which the entry of autonomous mobile robot 300 is prohibited on the travel map.

Examples of other processes executed by restricted access information generator 127 will now be specifically described again with reference to FIG. 12. Restricted access information generator 127 may execute the following processes other than those described above.

For example, in (b) in FIG. 12, restricted access information generator 127 first identifies pairing candidates to be paired with first marker 1*e*1 in the loop process for each first marker. First marker 1*g*1 and first marker 1*f*1 are the two pairing candidates. Restricted access information generator 127 determines whether first marker 1*e*1 and first marker 1*g*1 are placed parallel to one wall surface (step S58), determines that first marker 1*e*1 and first marker 1*g*1 are placed parallel to one wall surface (Yes in step S58), and excludes first marker 1*g*1 from the pairing candidates (step S59). Here, because first marker 1*f*1 is the only pairing candidate that can be paired with first marker 1e1 (Yes in step S55), restricted access information generator 127 defines line 2c connecting first marker 1e1 and other first marker 1f1 as a boundary for first marker 1e1 (step S56). Next, for first marker 1g1, restricted access information generator 127 identifies pairing candidates to be paired with first marker 1g1. The pairing candidates include first marker 1e1 and first marker 1h1. However, because first marker 1e1 is used to define a boundary (Yes in step S57), restricted access information generator 127 excludes first marker 1e1 from the pairing candidates (step S59).

For example, as illustrated in (c) in FIG. 12, in a case where one of the placement points where the first markers facing each other are placed is a wall surface and the other is a glass panel (or a stairwell or the like that is difficult for position sensor 110 to detect), restricted access information generator 127 executes the process in step S58. For example, in a case where first marker 1e2 and first marker 1g2 are placed parallel to one wall surface (Yes in step S58) and where first marker 1f2 and first marker 1h2 are placed parallel to one glass panel, restricted access information generator 127 excludes first marker 1g2 from the pairing candidates to be paired with first marker 1e2 (step S59). Because first marker 1e2 and other first marker 1f2 are the only remaining pair (Yes in step S55), restricted access information generator 127 defines a line connecting first marker 1e2 and other first marker 1f2 as a boundary (step S56).

Figure 13:
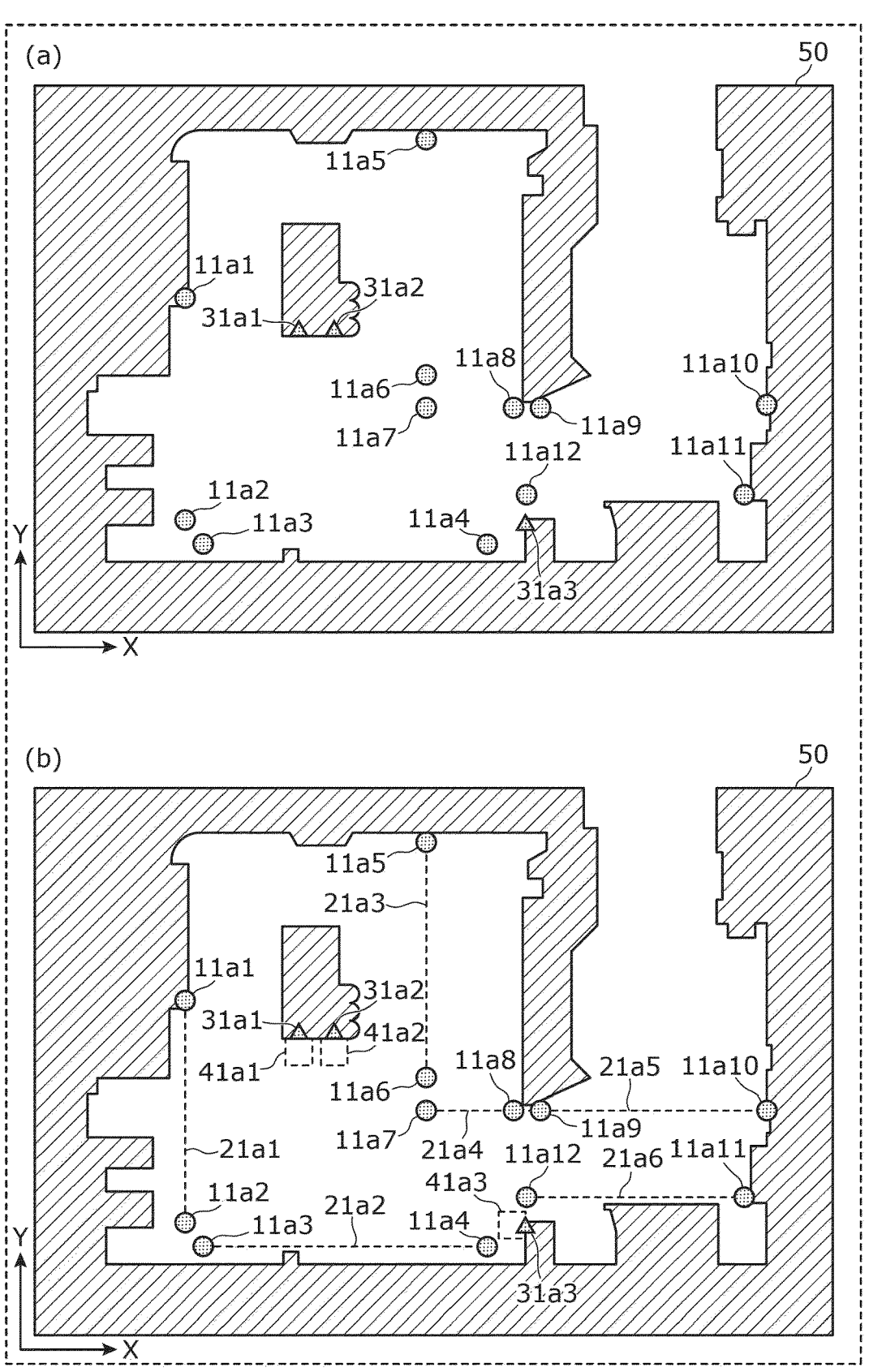
FIG. 13 schematically illustrates an example of the boundary definition process.

Next, the boundary definition process executed by restricted access information generator 127 will be specifically described with reference to FIG. 13. FIG. 13 schematically illustrates an example of the boundary definition process. (a) in FIG. 13 is a diagram illustrating the types of the markers identified by marker identifier 125 and the positions of the identified markers on a predetermined floor. (b) in FIG. 13 is a diagram illustrating an example of floor map 50 on which boundaries are defined by restricted access information generator 127.

In the operation example illustrated in FIG. 11, restricted access information generator 127 extracts the first markers out of the multiple markers on the floor map stored in the database in storage 130, and then extracts the second markers after the boundary definition process for all the first markers is complete. However, the operation is not limited to this. For example, restricted access information generator 127 may extract all the markers on the floor map stored in the database (for example, see (a) in FIG. 13). Moreover, for example, restricted access information generator 127 may execute the boundary definition process for the first markers after the boundary definition process for all the second markers is complete.

For example, as illustrated in (a) in FIG. 13, restricted access information generator 127 extracts all the markers on floor map 50 of a predetermined floor from the database in storage 130. Here, the X-axis is a horizontal axis in top view of floor map 50, whereas the Y-axis is a vertical axis in top view of floor map 50. The following describes an example with reference to (b) in FIG. 13. In this example, walls in floor map 50 extend along the X-axis or the Y-axis. Accordingly, the first direction and the second direction are either the X-axis or the Y-axis of floor map 50. However, the arrangement is a mere example and is not limited to this. For example, in a case where the walls in the floor map extend in directions at certain angles to the X-axis or the Y-axis, the positional relationships of the first markers relative to each other are determined using the first direction and the second direction.

Next, restricted access information generator 127 executes the boundary definition process for the first markers out of the markers extracted. Restricted access information generator 127 checks for first marker 11a1 out of the multiple first markers on the floor map whether there are any other first markers adjacent to first marker 11a1 in the X-axis direction and in the Y-axis direction, and detects first marker 11a2 adjacent to first marker 11a1 in the Y-axis direction as a pairing candidate. Restricted access information generator 127 determines that first marker 11a1 is paired only with first marker 11a2, and defines line 21a1 connecting these first markers as a boundary.

As in the case of first marker 11a1, restricted access information generator 127 executes the boundary definition process for each of first marker 11a5, first marker 11a10, and first marker 11a11. Each of these three first markers is also paired with only one other first marker as is first marker 11a1. Accordingly, restricted access information generator 127 defines line 21a3 connecting first marker 11a5 and first marker 11a6 as a boundary, line 21a5 connecting first marker 11a10 and first marker 11a9 as a boundary, and line 21a6 connecting first marker 11a11 and first marker 11a12 as a boundary.

In this manner, restricted access information generator 127 may detect the first markers each of which is paired with only one other first marker to define boundaries.

Moreover, for example, it is assumed that first marker 11a3 and first marker 11a4 are placed in front of a glass panel. In this case, restricted access information generator 127 checks whether there are any other first markers adjacent to first marker 11a3 in the X-axis direction and in the Y-axis direction, and detects first marker 11a4 adjacent to first marker 11a3 in the X-axis direction. Restricted access information generator 127 determines that first marker 11a3 is paired only with first marker 11a4, and defines line 21a2 connecting these first markers as a boundary.

Next, restricted access information generator 127 executes the boundary definition process for first marker 11a8. Restricted access information generator 127 checks for first marker 11a8 whether there are any other first markers adjacent to first marker 11a8 in the X-axis direction and in the Y-axis direction, and detects first marker 11a7 and first marker 11a9 adjacent to first marker 11a8 in the X-axis direction as pairing candidates. Restricted access information generator 127 determines that first marker 11a9 is used to define a boundary, and excludes first marker 11a9 from the pairing candidates. Restricted access information generator 127 then determines that first marker 11a8 is paired only with first marker 11a7, and defines line 21a4 connecting these first markers as a boundary.

Next, restricted access information generator 127 executes the boundary definition process for the second markers out of the markers extracted. Here, for example, the second markers are used to define boundaries enclosing rectangular zones with a predetermined size (for example, 60 cm×60 cm) as restricted areas, although not limited thereto. As described above, the second markers may be used to define boundaries enclosing polygonal zones, circular zones, or elliptical zones with predetermined sizes as restricted areas.

For second marker 31a1 out of the multiple second markers on the floor map, restricted access information generator 127 defines a boundary enclosing a rectangular zone with a predetermined size from the position of second marker 31a1 as a restricted area. For example, restricted access information generator 127 defines boundary 41a1 with a square U shape such that the position of second marker 31a1 is located in the middle of one side of the rectangular zone adjacent to a wall surface to define a restricted area enclosed by the wall surface and boundary 41a1 with the square U shape.

As in the case of second marker 31a1, restricted access information generator 127 executes the boundary definition process for each of second marker 31a2 and second marker 31a3. Restricted access information generator 127 defines boundary 41a2 enclosing a rectangular zone with a predetermined size from the position of second marker 31a2 as a restricted area, and defines boundary 41a3 enclosing a rectangular zone with a predetermined size from the position of second marker 31a3 as a restricted area.

Figure 14:
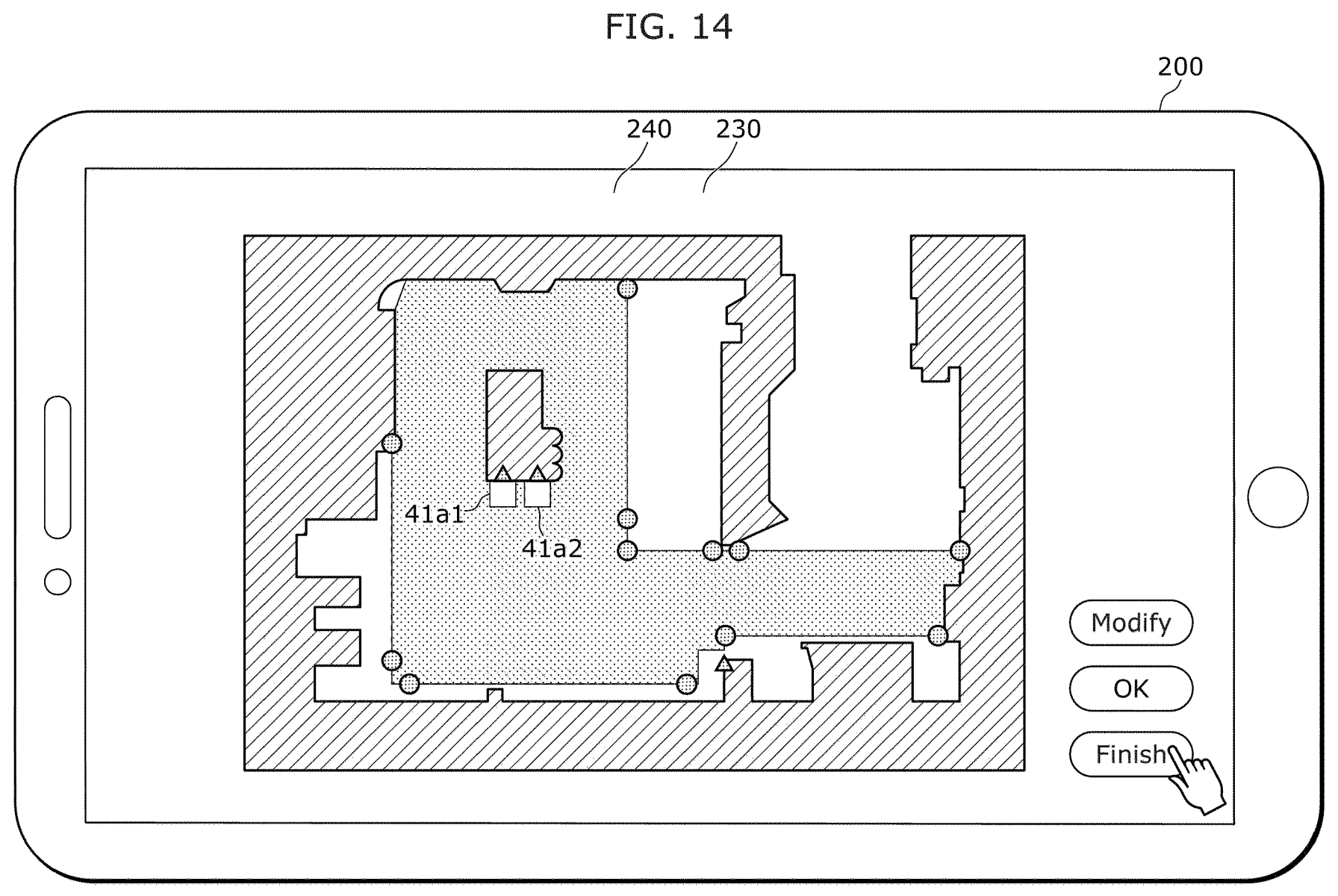

Note that travel map creating apparatus 100 notifies the user that the travel map creation process is complete using notifier 150 when the creation of the travel map is complete and that the travel map may be presented to the user at this moment. In a case where acceptor 240 in information terminal 200 accepts an instruction to modify the boundaries, travel map creating apparatus 100 may modify the boundaries defined on floor map 50 according to the instruction. FIG. 14 illustrates an example of displayed information.

As illustrated in FIG. 14, controller 220 in information terminal 200 causes notifier 230 to display the restricted access information generated by restricted access information generator 127 in travel map creating apparatus 100.

For example, when acceptor 240 in information terminal 200 accepts the modification instruction, controller 220 outputs the modification instruction accepted by acceptor 240 to travel map creating apparatus 100. For example, to remove the gap between the two restricted areas enclosed by boundary 41a1 and boundary 41a2 displayed in notifier 230, the user first taps on Modify button, drags the right side of boundary 41a1 to the right with their finger, drags the left side of boundary 41a2 to the left with their finger, and then taps on Finish button.

When travel map creating apparatus 100 obtains the user instruction (here, modification instruction), restricted access information generator 127 modifies the restricted access information on the basis of the obtained modification instruction. On the other hand, in a case where travel map creating apparatus 100 does not obtain any modification instruction, that is, in a case where the user does not issue any modification instruction, travel map creator 128 in travel map creating apparatus 100 creates the travel map including the boundaries presented to the user.

In this manner, autonomous mobile robot system 400 can accept the user instruction and modify the restricted access information. This allows the restricted areas to be appropriately defined. Accordingly, autonomous mobile robot system 400 can create the travel plan on the basis of the travel map including appropriately defined restricted areas and thus can control the travel of autonomous mobile robot 300 more appropriately.

Note that the restricted access information can be modified either during the creation of the travel map or after the creation of the travel map.

[4. Effects and the Like]

As described above, travel map creating apparatus 100 is an apparatus that creates a travel map for autonomous mobile robot 300 that autonomously travels in a predetermined floor. Travel map creating apparatus 100 includes position sensor 110 that detects objects around the travel map creating apparatus and that obtains the positional relationships of the objects relative to the travel map creating apparatus; floor map creator 124 that creates a floor map representing the predetermined floor on the basis of the positional relationships obtained by position sensor 110; self-position calculator 123 that calculates a self-position that is the position of the travel map creating apparatus on the floor map created by floor map creator 124; marker identifier 125 that identifies markers around the travel map creating apparatus; marker position calculator 126 that calculates relative positions of the markers to the travel map creating apparatus; mode switcher 122 that switches the mode of the travel map creating apparatus between a floor map creation mode in which the floor map is created and a marker identification mode in which the markers are identified; restricted access information generator 127 that defines boundaries of restricted areas to which the entry of autonomous mobile robot 300 is prohibited on the basis of the floor map, the self-position, and the relative positions of the markers and that generates restricted access information including boundary information that indicates the defined boundaries; and travel map creator 128 that creates a travel map including the defined restricted areas on the basis of the restricted access information generated by restricted access information generator 127.

Thus, travel map creating apparatus 100 can switch between the floor map creation mode and the marker identification mode, causing the markers not to be identified during the floor map creation mode. Accordingly, for example, travel map creating apparatus 100 does not detect changes in the self-position while travel map creating apparatus 100 is not moving caused by identification of markers (for example, markers being carried to placement points). As a result, travel map creating apparatus 100 can eliminate or minimize the distortion of the map caused by the changes in the self-position, thereby being able to create the travel map accurately.

For example, in travel map creating apparatus 100, mode switcher 122 may switch the mode of travel map creating apparatus 100 to the floor map creation mode when travel map creating apparatus 100 is traveling and to the marker identification mode when travel map creating apparatus 100 is at rest.

This allows travel map creating apparatus 100 to automatically switch between the two modes depending on whether travel map creating apparatus 100 is traveling or at rest, saving the user time and effort. Accordingly, travel map creating apparatus 100 can create the travel map in a simpler manner.

For example, travel map creating apparatus 100 may further include acceptor 140 that accepts an instruction to switch the mode of the travel map creating apparatus. Mode switcher 122 may switch the mode of the travel map creating apparatus between the floor map creation mode and the marker identification mode according to the instruction when acceptor 140 accepts the instruction.

This allows travel map creating apparatus 100 to switch appropriately between the two modes according to the accepted instruction.

For example, in travel map creating apparatus 100, floor map creator 124 may not reflect the relative positions of the markers identified by marker identifier 125 in the floor map when travel map creating apparatus 100 is traveling, whereas floor map creator 124 may reflect the relative positions of the markers identified by marker identifier 125 in the floor map when travel map creating apparatus 100 is at rest.

This allows travel map creating apparatus 100 to reflect the relative positions of the markers identified by marker identifier 125 in the floor map depending on whether travel map creating apparatus 100 is traveling or at rest, saving the user the trouble of switching the mode. Thus, travel map creating apparatus 100 can create the travel map in a simpler manner.

For example, in travel map creating apparatus 100, marker identifier 125 may identify the markers on the basis of data sensed by at least one of position sensor 110 or a sensor that is different from position sensor 110 (for example, imager 112). Position sensor 110 may be a LIDAR system, and the sensor that is different from position sensor 110 may be a distance image sensor.

This allows travel map creating apparatus 100 to select data used to identify the markers according to the types of the markers, enabling the markers to be identified more accurately.

For example, in travel map creating apparatus 100, marker identifier 125 may further identify the types of the markers. The types of the markers may be at least one of a reflective marker, an identification marker, projector light, movements of bodies, or the number of fingers. Restricted access information generator 127 may generate the restricted access information corresponding to the types of the markers identified by marker identifier 125.

This allows travel map creating apparatus 100 to generate the restricted access information corresponding to the types of the markers, enabling the restricted areas to be defined in the travel map easily.

For example, travel map creating apparatus 100 may further include notifier 150, and notifier 150 may use at least one of sound, light, or images to notify the user that marker identifier 125 has identified the markers.

This allows travel map creating apparatus 100 to use at least one of sound, light, or images to notify the user that the travel map creating apparatus has identified the markers.

For example, travel map creating apparatus 100 may further include communicator 160 that can connect to and communicate with information terminal 200 used by the user, and communicator 160 may notify information terminal 200 that marker identifier 125 has identified the markers.

This allows travel map creating apparatus 100 to notify the user that the markers have been identified through information terminal 200 of the user.

For example, in travel map creating apparatus 100, the markers may include first markers for defining the boundaries and second markers that are different from the first markers and that do not define the boundaries. Marker identifier 125 may identify the markers as either the first markers or the second markers during identification of the markers. Restricted access information generator 127 may calculate the positions of the markers on the floor map on the basis of the floor map, the self-position, and the relative positions of the markers, and may store in a database (not illustrated in FIG. 1) in storage 130 the calculated positions of the markers on the floor map in association with information indicating whether the identified markers are either the first markers or the second markers.

This allows travel map creating apparatus 100 to generate the restricted access information corresponding to the types of the markers, enabling the restricted areas to be defined in the travel map easily.

For example, in travel map creating apparatus 100, restricted access information generator 127 may extract first markers 11*a*1 to 11*a*12 out of multiple markers on floor map 50 (see (a) in FIG. 13) stored in the database. In a case where, out of first markers 11*a*1 to 11*a*12 extracted, first marker 11*a*1 is paired only with other first marker 11*a*2 adjacent to first marker 11*a*1 in a first direction parallel to the wall near first marker 11*a*1 or in a second direction perpendicular to the first direction (in (a) in FIG. 13, vertical direction (Y-axis direction) or horizontal direction (X-axis direction) of floor map 50) in plan view of floor map 50, restricted access information generator 127 may define line 21*a*1 (see (b) in FIG. 13) connecting first marker 11*a*1 and other first marker 11*a*2 as a boundary.

This allows travel map creating apparatus 100 to define the boundary at a spot where first marker 11*a*1 is paired only with other first marker 11*a*2 adjacent to first marker 11*a*1 in the first direction parallel to the wall near first marker 11*a*1 or in the second direction perpendicular to the first direction in top view of floor map 50, enabling reliable boundary definition.

For example, in travel map creating apparatus 100, (i) in a case where, out of first markers 11*a*1 to 11*a*12 extracted (see (b) in FIG. 13), first marker 11*a*8 can be paired with two other first markers 11*a*7 and 11*a*9, both the other first markers being adjacent to first marker 11*a*8 in the first direction or in the second direction (in (b) in FIG. 13, vertical direction (Y-axis direction) or horizontal direction (X-axis direction) of floor map 50) in top view of floor map 50, or (ii) in a case where first marker 11*a*7 can be paired with one or more other first markers 11*a*6 and 11*a*8 respectively adjacent to first marker 11*a*7 in the first direction and in the second direction (in (b) in FIG. 13, vertical direction (Y-axis direction) and horizontal direction (X-axis direction) of floor map 50) in top view of floor map 50, restricted access information generator 127 may exclude other first markers 11*a*6 and 11*a*9 that are used to define the boundaries from pairing candidates for defining the boundaries together with first marker 11*a*8.

This allows travel map creating apparatus 100 to exclude the first markers that have been already used to define the boundaries from the pairing candidates in the case where first markers 11*a*7 and 11*a*8 can be paired with multiple pairing candidates, enabling the boundaries to be defined accurately.

For example, in travel map creating apparatus 100, under (i) or (ii), in a case where first marker 1*a* (see (a) in FIG. 12) and other first marker 1*b* are each placed parallel to one wall surface on the predetermined floor, restricted access information generator 127 may further exclude other first marker 1*b* from the pairing candidates.

This allows travel map creating apparatus 100 to define the line connecting first marker 1*a* and first marker 1*b* away from first marker 1*a* in a direction perpendicular to the direction along the one wall surface as the boundary, enabling reliable boundary definition.

For example, in travel map creating apparatus 100, second markers 31*a*1, 31*a*2, and 31*a*3 (see (b) in FIG. 13) may be markers for defining boundaries enclosing the restricted areas, and restricted access information generator 127 may define boundary 41*a*1 enclosing a zone with a predetermined size and a predetermined shape from the position of second marker 31*a*1 on the floor map as the restricted area.

This allows travel map creating apparatus 100 to generate the restricted access information corresponding to the types of the markers, enabling the restricted areas to be defined in the travel map easily.

Moreover, a travel map creating method is a method, performed by a travel map creating apparatus, for creating a travel map for autonomous mobile robot 300 that autonomously travels in a predetermined floor. The travel map creating method includes detecting objects around the travel map creating apparatus and obtaining the positional relationships of the objects relative to the travel map creating apparatus (step S03 in FIG. 7); creating a floor map representing the predetermined floor on the basis of the positional relationships obtained in the obtaining (step S05); calculating a self-position that is the position of the travel map creating apparatus on the floor map created in the creating (step S06); identifying markers around the travel map creating apparatus (step S08); calculating the relative positions of the markers to the travel map creating apparatus (step S09); switching the mode of the travel map creating apparatus between a floor map creation mode in which the floor map is created and a marker identification mode in which the markers are identified (step S07); defining boundaries of restricted areas to which the entry of autonomous mobile robot 300 is prohibited on the basis of the floor map, the self-position, and the relative positions of the markers, and generating restricted access information including boundary information that indicates the defined boundaries (step S10); and creating a travel map including the defined restricted areas on the basis of the restricted access information generated in the generating (step S11).

This allows the travel map creating apparatus that performs the travel map creating method to create the travel map accurately.

Other Embodiments

Although an embodiment has been described above, the above-described embodiment is not intended to limit the present disclosure.

For example, in the embodiment, travel map creating apparatus 100 includes position sensor 110 and imager 112 but does not need to include position sensor 110 and imager 112. For example, travel map creating apparatus 100 may be an information processor including configurations other than position sensor 110 and imager 112. In this case, the information processor may receive data obtained by a sensor including position sensor 110 and imager 112 and placed on hand cart 190 while the sensor moves on a predetermined floor.

For example, in the embodiment, the travel map created by travel map creating apparatus 100 is sent to autonomous mobile robot 300 through network 10, although not limited thereto. For example, travel map creating apparatus 100 may send the travel map to information terminal 200 through network 10, and information terminal 200 may send the obtained travel map to autonomous mobile robot 300 through network 10. Note that network 10 is a wide area network, such as the Internet, but may be a local area network, such as Wi-Fi (registered trademark).

Moreover, for example, autonomous mobile robot 300 may obtain the travel map through a USB (Universal Serial Bus) memory storing the travel map created by travel map creating apparatus 100.

For example, in the embodiment, travel map creating apparatus 100 and autonomous mobile robot 300 are separate apparatuses. However, travel map creating apparatus 100 may be integrated into autonomous mobile robot 300 to be a single apparatus.

For example, in the embodiment, autonomous mobile robot system 400 is achieved by multiple apparatuses but may be achieved as a single apparatus. Moreover, in the case where the system is achieved by multiple apparatuses, the elements included in autonomous mobile robot system 400 may be freely allocated in the multiple apparatuses. Moreover, for example, a server that can communicate with autonomous mobile robot system 400 may include multiple elements included in controllers 120 and 340.

For example, the communication method among the travel map creating apparatuses in the above-described embodiment is not limited in particular. Moreover, a relay apparatus (not illustrated) may be involved in the communication among the travel map creating apparatuses.

Moreover, in the above-described embodiment, processes performed by specific processors may be performed by other processors. Moreover, the order in which multiple processes are performed may be changed, and the multiple processes may be performed in parallel.

Moreover, in the above-described embodiment, the elements may be achieved through executing software programs suitable for the elements. The elements may be achieved as a program executor, such as a CPU or a processor, reads out and executes software programs stored in a recording medium, such as a hard disk or semiconductor memory.

Moreover, the elements may be achieved by hardware. For example, the elements may be circuits (or integrated circuits). These circuits may constitute one circuit as a whole or may be separate circuits. Moreover, these circuits may be general-purpose circuits or dedicated circuits.

Moreover, general or specific modes of the present disclosure may be achieved by systems, apparatuses, methods, integrated circuits, computer programs, or computer-readable recording media, such as CD-ROMs. Moreover, the modes may be achieved by any combinations of systems, apparatuses, methods, integrated circuits, computer programs, and recording media.

For example, the present disclosure may be achieved as a travel control method performed by a computer, such as travel map creating apparatus 100, or may be achieved as a program for causing a computer to perform such a travel control method. Moreover, the present disclosure may be achieved as a program for causing a general-purpose computer to operate as travel map creating apparatus 100 according to the above-described embodiment. The present disclosure may be achieved as a non-transitory computer-readable recording medium storing the above-described programs.

The scope of the present disclosure encompasses forms obtained by various modifications, to the embodiments, that can be conceived by those skilled in the art and forms achieved by freely combining elements and functions in different embodiments without departing from the spirit of the present disclosure as well.

INDUSTRIAL APPLICABILITY

The present disclosure is widely available to create travel maps for robots that autonomously travel.

The invention claimed is:

1. A travel map creating apparatus that creates a travel map for an autonomous mobile robot that autonomously travels in a predetermined floor, the travel map creating apparatus comprising:

a position sensor that detects an object around the travel map creating apparatus and that obtains a positional relationship of the object relative to the travel map creating apparatus;

a floor map creator that creates a floor map representing the predetermined floor based on the positional relationship obtained by the position sensor;

a self-position calculator that calculates a self-position that is a position of the travel map creating apparatus on the floor map created by the floor map creator;

a marker identifier that identifies a marker around the travel map creating apparatus;

a marker position calculator that calculates a relative position of the marker to the travel map creating apparatus;

a mode switcher that switches a mode of the travel map creating apparatus between a floor map creation mode in which the floor map is created and a marker identification mode in which the marker is identified;

a restricted access information generator that, based on the floor map, the self-position, and the relative position of the marker, defines a boundary of a restricted area to which entry of the autonomous mobile robot is prohibited and generates restricted access information including boundary information that indicates the defined boundary; and a travel map creator that creates a travel map including the defined restricted area based on the restricted access information generated by the restricted access information generator, wherein the floor map creator does not reflect the relative position of the marker identified by the marker identifier in the floor map when the travel map creating apparatus is traveling, whereas the floor map creator reflects the relative position of the marker identified by the marker identifier in the floor map when the travel map creating apparatus is at rest.

2. The travel map creating apparatus according to claim 1, wherein the mode switcher switches the mode of the travel map creating apparatus to the floor map creation mode when the travel map creating apparatus is traveling and to the marker identification mode when the travel map creating apparatus is at rest.

3. The travel map creating apparatus according to claim 1, further comprising:

an acceptor that accepts an instruction to switch the mode of the travel map creating apparatus, wherein when the acceptor accepts the instruction, the mode switcher switches the mode of the travel map creating apparatus between the floor map creation mode and the marker identification mode according to the instruction.

4. The travel map creating apparatus according to claim 1, wherein the marker identifier identifies the marker based on data sensed by at least one of the position sensor or a sensor that is different from the position sensor, the position sensor is a laser imaging detection and ranging (LIDAR) system, and the sensor that is different from the position sensor is a distance image sensor.

5. The travel map creating apparatus according to claim 1, wherein the marker identifier further identifies a type of the marker, the type of the marker is at least one of a reflective marker, an identification marker, projector light, a movement of a body, or a total number of fingers, and the restricted access information generator generates restricted access information corresponding to the type of the marker identified by the marker identifier.

6. The travel map creating apparatus according to claim 1, further comprising:

a notifier, wherein the notifier uses at least one of sound, light, or an image to notify a user that the marker identifier has identified the marker.

7. The travel map creating apparatus according to claim 1, further comprising:

a communicator that can connect to and communicate with an information terminal used by a user, wherein the communicator notifies the information terminal that the marker identifier has identified the marker.

8. The travel map creating apparatus according to claim 1, wherein the marker includes a first marker for defining the boundary and a second marker that is different from the first marker and that does not define the boundary, the marker identifier identifies the marker as either the first marker or the second marker during identification of the marker, and the restricted access information generator calculates a position of the marker on the floor map based on the floor map, the self-position, and the relative position of the marker, and stores in a database the calculated position of the marker on the floor map in association with information indicating whether the identified marker is either the first marker or the second marker.

9. The travel map creating apparatus according to claim 8, wherein the marker comprises a plurality of markers, and the first marker comprises a plurality of first markers, the restricted access information generator extracts the plurality of first markers out of the plurality of markers on the floor map stored in the database, and in a case where, out of the plurality of first markers extracted, one first marker is paired with only one other first marker adjacent to the one first marker in a first direction parallel to a wall near the one first marker or in a second direction perpendicular to the first direction in a top view of the floor map, the restricted access information generator defines a line connecting the one first marker and the other first marker as the boundary.

10. The travel map creating apparatus according to claim 9, wherein (i) in a case where, out of the plurality of first markers extracted, the one first marker can be paired with two other first markers, both the other first markers being adjacent to the one first marker in the first direction or in the second direction in the top view of the floor map or (ii) in a case where the one first marker can be paired with at least one other first marker adjacent to the one first marker in the first direction and at least one other first marker adjacent to the one first marker in the second direction in the top view of the floor map, the restricted access information generator excludes each other first marker that is used to define the boundary from pairing candidates for defining the boundary together with the one first marker.

11. The travel map creating apparatus according to claim 10, wherein under (i) or (ii), in a case where the one first marker and each other first marker are each placed parallel to one wall surface on the predetermined floor, the restricted access information generator further excludes each other first marker from the pairing candidates.

12. The travel map creating apparatus according to claim 9, wherein the second marker is a marker for defining a boundary enclosing the restricted area, and the restricted access information generator defines the boundary enclosing a zone with a predetermined size and a predetermined shape from a position of the second marker on the floor map as the restricted area.

13. A travel map creating method, performed by a travel map creating apparatus, for creating a travel map for an autonomous mobile robot that autonomously travels in a predetermined floor, the travel map creating method comprising:

detecting an object around the travel map creating apparatus and obtaining a positional relationship of the object relative to the travel map creating apparatus;

creating a floor map representing the predetermined floor based on the positional relationship obtained in the obtaining;

calculating a self-position that is a position of the travel map creating apparatus on the floor map created in the creating;

identifying a marker around the travel map creating apparatus;

calculating a relative position of the marker to the travel map creating apparatus;

switching a mode of the travel map creating apparatus between a floor map creation mode in which the floor map is created and a marker identification mode in which the marker is identified;

based on the floor map, the self-position, and the relative position of the marker, defining a boundary of a restricted area to which entry of the autonomous mobile robot is prohibited and generating restricted access information including boundary information that indicates the defined boundary; and creating a travel map including the defined restricted area based on the restricted access information generated in the generating, wherein in the creating of the floor map, the relative position of the marker identified in the identifying is not reflected in the floor map when the travel map creating apparatus is traveling, whereas the relative position of the marker identified in the identifying is reflected in the floor map when the travel map creating apparatus is at rest.

14. A non-transitory computer-readable recording medium having recorded thereon a computer program for causing a computer to execute the travel map creating method according to claim 13.

15. A travel map creating apparatus that creates a travel map for an autonomous mobile robot that autonomously travels in a predetermined floor, the travel map creating apparatus comprising:

a position sensor that detects an object around the travel map creating apparatus and that obtains a positional relationship of the object relative to the travel map creating apparatus;

a floor map creator that creates a floor map representing the predetermined floor based on the positional relationship obtained by the position sensor;

a self-position calculator that calculates a self-position that is a position of the travel map creating apparatus on the floor map created by the floor map creator;

a marker identifier that identifies a marker around the travel map creating apparatus;

a marker position calculator that calculates a relative position of the marker to the travel map creating apparatus; and a mode switcher that switches a mode of the travel map creating apparatus between a floor map creation mode in which the floor map is created and a marker identification mode in which the marker is identified, wherein the floor map creator does not reflect the relative position of the marker identified by the marker identifier in the floor map when the travel map creating apparatus is traveling, whereas the floor map creator reflects the relative position of the marker identified by the marker identifier in the floor map when the travel map creating apparatus is at rest.

\* \* \* \* \*